US006295136B1

(12) United States Patent
Ono et al.

(10) Patent No.: US 6,295,136 B1
(45) Date of Patent: *Sep. 25, 2001

(54) PRINTER CONTROL APPARATUS METHOD OF CONTROLLING PRINTER AND RECORDING MEDIUM USED THEREFOR

(75) Inventors: Katsuhiro Ono; Kiyotaka Nishimura, both of Suwa (JP)

(73) Assignee: Seiko Epson Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/956,468

(22) Filed: Oct. 23, 1997

(30) Foreign Application Priority Data

Oct. 29, 1906 (JP) .................................... 8-303949
Nov. 1, 1996 (JP) .................................... 8-307338
Sep. 19, 1997 (JP) .................................... 9-273598

(51) Int. Cl.[7] .................................................. G06F 15/00
(52) U.S. Cl. ...................... 358/1.15; 358/1.13; 358/1.18; 345/350
(58) Field of Search ........................ 345/350, 353, 345/351, 349, 976, 977; 395/101, 112, 114, 117; 358/468, 498, 1.1, 1.13, 1.14, 1.18

(56) References Cited

U.S. PATENT DOCUMENTS

| | | | |
|---|---|---|---|
| 5,095,371 | * | 3/1992 | Tanaka et al. ........................ 358/300 |
| 5,398,289 | * | 3/1995 | Rourke et al. ........................ 395/117 |
| 5,706,411 | * | 1/1998 | McCormick et al. ............... 358/1.14 |
| 5,745,659 | * | 4/1998 | Rigau et al. .......................... 395/101 |
| 5,784,177 | * | 7/1998 | Sanchez et al. ...................... 395/114 |
| 5,877,746 | * | 3/1999 | Parks et al. .......................... 345/156 |

FOREIGN PATENT DOCUMENTS 0 575 168 A1 * 6/1993 (JP) ................................ G06F/3/12

* cited by examiner

Primary Examiner—Edward Coles
Assistant Examiner—Mark Wallerson
(74) Attorney, Agent, or Firm—Oblon, Spivak, McClelland, Maier & Neustadt, P.C.

(57) ABSTRACT

A printer driver of the present invention informs the operator of some pieces of information specified on another tab during data input operations on a predetermined tab. This structure makes the printer driver easy to use. Composite image data stored as display image data into a display image memory include image data representing a Main tab CD3 and image data representing data of Paper Size and Printing Orientation input on a Paper tab CD4. A composite image including the Main tab CD3 and the data of Paper Size and Printing Orientation input on the Paper tab CD4 is accordingly displayed on a CRT. This structure informs the operator of the data specified on the Paper tab CD4, while the operator carries out data input operations on the Main tab CD3.

17 Claims, 29 Drawing Sheets

| | OUTPUT RESOLUTION | MICRO WEAVE | HALFTONING |
|---|---|---|---|
| HIGH QUALITY | 720×720 | SUPER | ERROR DIFFUSION |
| QUALITY | 720×720 | ON | ERROR DIFFUSION |
| STANDARD | 720×720 | ON | ERROR DIFFUSION |
| SPEED | 720×360 | ON | FINE DITHERING |

TBL2

Fig. 23

| PAPER FEED d5 | ASF | ASF | ASF | ASF |
|---|---|---|---|---|
| PAPER SIZE d1 | A4 210×297 | A4 210×297 | A4 210×297 | A4 210×297 |
| ORIENTATION d3 | PORTRAIT | PORTRAIT | STANDARD | LANDSCAPE |
| PRINTABLE AREA d4 | STANDARD | CENTERED | STANDARD | CENTERED |
| NAME OF IMAGE DATA | pic01 | pic02 | pic03 | pic04 |

| ASF | ASF | ASF | ASF |
|---|---|---|---|
| A4L 210×297 | A4L 210×297 | A4L 210×297 | A4L 210×297 |
| PORTRAIT | PORTRAIT | LANDSCAPE | LANDSCAPE |
| STANDARD | CENTERED | STANDARD | CENTERED |
| pic05 | pic06 | pic07 | pic08 |

| ASF | ASF | ASF | ASF |
|---|---|---|---|
| ENV 120×235 | ENV 120×235 | ENV 120×235 | ENV 120×235 |
| PORTRAIT | PORTRAIT | LANDSCAPE | LANDSCAPE |
| STANDARD | CENTERED | STANDARD | CENTERED |
| pic09 | pic10 | pic11 | pic12 |

| ASF | MANUAL | MANUAL | MANUAL |
|---|---|---|---|
| P.C. 100×147 | A4 210×297 | A4 210×297 | A4 210×297 |
| PORTRAIT | PORTRAIT | PORTRAIT | LANDSCAPE |
| STANDARD | STANDARD | CENTERED | STANDARD |
| pic13 | pic14 | pic15 | pic16 |

| MANUAL | MANUAL | MANUAL | MANUAL |
|---|---|---|---|
| A4 210×297 | A4L 210×297 | A4L 210×297 | A4L 210×297 |
| LANDSCAPE | PORTRAIT | PORTRAIT | LANDSCAPE |
| CENTERED | STANDARD | CENTERED | STANDARD |
| pic17 | pic18 | pic19 | pic20 |

| MANUAL | MANUAL | MANUAL | MANUAL |
|---|---|---|---|
| A4L 210×297 | ENV 120×235 | ENV 120×235 | ENV 120×235 |
| LANDSCAPE | PORTRAIT | PORTRAIT | LANDSCAPE |
| CENTERED | STANDARD | CENTERED | STANDARD |
| pic21 | pic22 | pic23 | pic24 |

| MANUAL | MANUAL | TRACTOR FEEDER | TRACTOR FEEDER |
|---|---|---|---|
| ENV 120×235 | P.C. 100×147 | CON. PAPER | CON. PAPER |
| LANDSCAPE | PORTRAIT | PORTRAIT | LANDSCAPE |
| CENTERED | STANDARD | STANDARD | CENTERED |
| pic25 | pic26 | pic27 | pic28 |

Fig. 24
ASF
| PAPER SIZE (ORIENTATION OF PAPER) | PRINTABLE AREA | PRINTING ORIENTATION | |
|---|---|---|---|
| | | PORTRAIT | LANDSCAPE |
| A4 210×297 VERTICAL | STANDARD | Pic 01 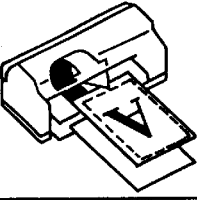 | Pic 03 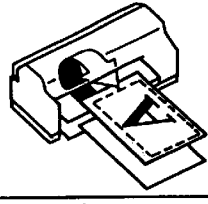 |
| | CENTERED | Pic 02 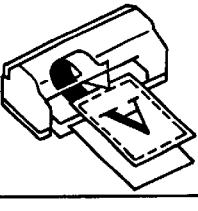 | Pic 04 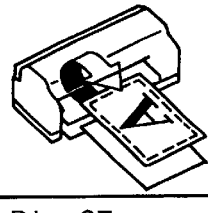 |
| A4 210×297 LATERAL | STANDARD | Pic 05 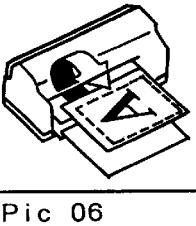 | Pic 07 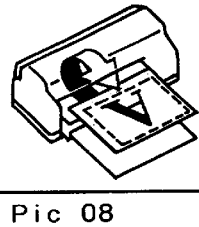 |
| | CENTERED | Pic 06 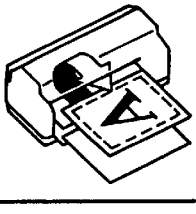 | Pic 08 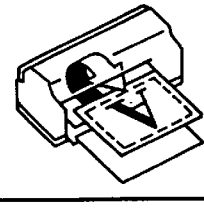 |

Fig. 25

| PAPER SIZE | PRINTABLE AREA | PRINTING ORIENTATION ||
|---|---|---|---|
| | | PORTRAIT | LANDSCAPE |
| ENVELOPE 120×235 | STANDARD | Pic 09 | Pic 11 |
| | CENTERED | Pic 10 | Pic 12 |

ASF

Fig. 26

| PAPER SIZE | PRINTABLE AREA | PRINTING ORIENTATION LANDSCAPE |
|---|---|---|
| POST CARD 100×147 | STANDARD | Pic 13 |

Fig. 27
MANUAL
| PAPER SIZE (ORIENTATION OF PAPER) | PRINTABLE AREA | PRINTING ORIENTATION | |
|---|---|---|---|
| | | PORTRAIT | LANDSCAPE |
| A4 210×297 VERTICAL | STANDARD | Pic 14 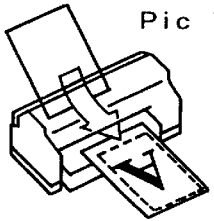 | Pic 16 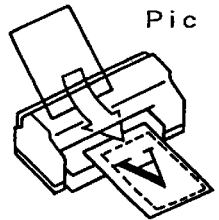 |
| | CENTERED | Pic 15 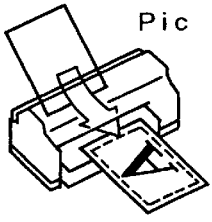 | Pic 17 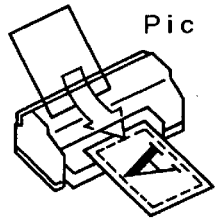 |
| A4 210×297 LATERAL | STANDARD | Pic 18 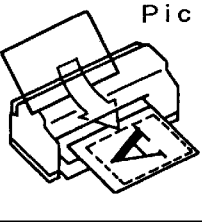 | Pic 20 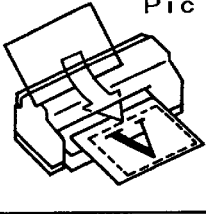 |
| | CENTERED | Pic 19 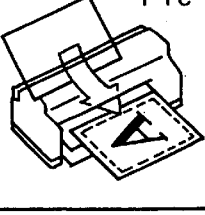 | Pic 21 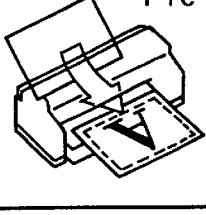 |

Fig. 28
MANUAL
| PAPER SIZE | PRINTABLE AREA | PRINTING ORIENTATION ||
| --- | --- | --- | --- |
| | | PORTRAIT | LANDSCAPE |
| ENVELOPE 120×235 | STANDARD | Pic 22 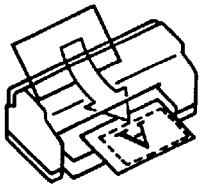 | Pic 24 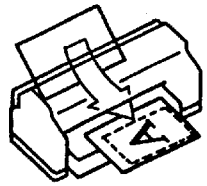 |
| | CENTERED | Pic 23 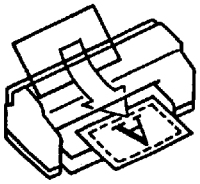 | Pic 25 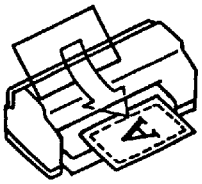 |
Fig. 29
| PAPER SIZE | PRINTABLE AREA | PRINTING ORIENTATION LANDSCAPE |
| --- | --- | --- |
| POST CARD 100×147 | STANDARD | Pic 26 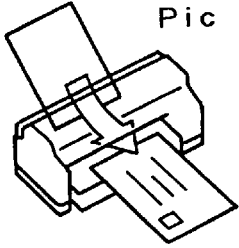 |

Fig. 30
TRACTOR FEEDER
| PAPER SIZE | PRINTABLE AREA | PRINTING ORIENTATION ||
|---|---|---|---|
| | | PORTRAIT | LANDSCAPE |
| CONTINUOUS PAPER | | Pic 27 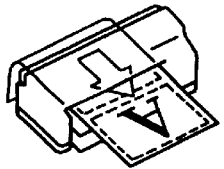 | Pic 28 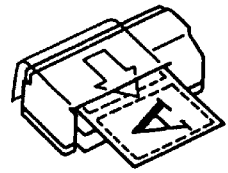 |

PRINTER CONTROL APPARATUS METHOD OF CONTROLLING PRINTER AND RECORDING MEDIUM USED THEREFOR

BACKGROUND OF THE INVENTION

1. Field of the Invention

The present invention relates to a technique of specifying various pieces of information used for printing in a predetermined printer and controlling the printer based on the specified information.

2. Description of the Related Art

It is generally required to incorporate the software called a printer driver into a computer, when printing data generated by the computer are printed by a printer connected to the computer. The printer driver is a computer program for setting various pieces of information regarding the printer, such as functions of the printer, an interface, font information, and control codes, in the computer so as to control the printer, and is provided for each model of the printer.

FIG. 33 shows a Properties dialog box 900 displayed by a conventional printer driver. The operator activates the printer driver incorporated in the computer through an operation of the computer and sets various pieces of information using the printer driver. In accordance with a concrete procedure, the operator opens the Properties dialog box 900 shown in FIG. 33 to set such information. The various pieces of information include those relating to the paper settings, such as the size and orientation of paper, and those relating to the graphics, such as the printing resolution and color adjustment, and are divided into a plurality of groups according to the functions. In the example of FIG. 33, the Properties dialog box 900 has a plurality of tabs 901 through 905 corresponding to the plurality of groups. The operator selects one tab among the plurality of tabs 901 through 905 with a pointing device, such as a mouse, in order to open and display the selected tab.

The operator inputs data on the displayed tab and thereby enables the information allocated to the tab to be set into the printer driver.

The prior art technique informs the operator of only pieces of information allocated to one selected and displayed tab during data input on the selected tab. In many cases, however, there is a demand for other pieces of information allocated to another tab during the data input on the selected tab. In these cases, the operator should select another tab including required pieces of information and change the display to another tab. When the change of display is carried out in the middle of data input on the selected tab, the operator should return the display to the selected tab. This structure requires the repeated operations of the pointing device for the change of display and consumes much labor of the operator.

When the operator desires to change the printing quality, the prior art technique requires the operator to input data regarding a number of items on a specific tab. Such data input consumes much labor of the operator.

SUMMARY OF THE INVENTION

The object of the present invention is thus to save the labor of an operator in the process of inputting data into a printer driver.

Part of the above and the other related objects is realized by a first printer control apparatus for setting various pieces of information required for printing in a predetermined printer. The first printer control apparatus comprises: tab image selection means for dividing the various pieces of information into a plurality of groups, providing image data that represent a plurality of tabs for various settings, each tab corresponding to each of the plurality of groups, and selecting specific image data of a desired tab among the image data representing the plurality of tabs in response to an external instruction; display control means for displaying the specific image data of the desired tab as display image data on a screen of a display unit; and additional information display means for displaying at least one piece of information, which is selected among plural pieces of information specified in another tab expressed by another set of image data that are different from the specific image data of the desired tab, in a predetermined area of the display image data.

In the first printer control apparatus of the present invention, an image expressed by image data representing at least one piece of information, which is selected among plural pieces of information specified in another tab expressed by another set of image data that are different from the specific image data of the desired tab selected by the tab image selection means, is displayed in a predetermined area of the image data representing the desired tab on the screen of the display unit.

This structure enables some pieces of information specified on another tab to be displayed on the screen of the display unit, while the operator carries out the data input operations on the desired tab. The first printer control apparatus significantly reduces the number of change of the tabs displayed on the screen, thereby saving the labor of the operator.

In accordance with one preferable application of the first printer control apparatus of the present invention, the desired tab corresponding to the specific image data selected by the tab image selection means specifies information on main settings relating to print quality, and another tab corresponding to another set of image data specifies information on paper settings relating to paper.

This structure enables some pieces of information specified, for example, on a Paper tab to be displayed on the screen of the display unit, while the operator carries out data input, for example, on a Main tab.

In accordance with another preferable application of the first printer control apparatus of the present invention, the desired tab corresponding to the specific image data selected by the tab image selection means has a switch for opening a customized settings dialog box, in which an operator can input plural pieces of information among the various pieces of information, and another set of image data representing another tab constitutes the customized settings dialog box.

While the operator carries out data input on the desired tab, this structure enables the operator to check the plural pieces of information specified on the customized settings dialog box that is open on the desired tab, without opening the customized settings dialog box.

The present invention is also directed to a second printer control apparatus for setting various pieces of print quality information that define printing quality by a predetermined printer as quality control information for controlling the predetermined printer. The second printer control apparatus comprises: first storage means for storing a plurality of parameters that represent the printing quality in a stepwise manner; second storage means for storing values of the print quality information that are set corresponding to each of the parameters and determine the printing quality defined by each parameter; print quality specifying means for specifying the printing quality desired by an operator by selecting one parameter among the plurality of parameters, in response to an operation of the predetermined printer by the operator; print quality information setting means for extracting the values of the print quality information corresponding to the parameter selected by the print quality specifying means from the second storage means, and setting the extracted values of the print quality information as the quality control information; range limiting means for restricting parameters selectable by the print quality specifying means to a plurality of predetermined parameters among the plurality of parameters stored in the first storage means; media type setting means for setting a type of media used in the predetermined printer; and limited range changing means for changing the selectable parameters restricted by the range limiting means according to the type of media set by the media type setting means.

In the second printer control apparatus of the present invention, the print quality specifying means selects a parameter representing the desired printing quality among the plurality of parameters, in response to an operation by the operator. The print quality information setting means subsequently extracts the print quality information according to the selected parameter. After the media type setting means sets the type of media, the limited range changing means changes the selectable parameters by the print quality specifying means according to the type of media. This structure enables even a non-skilled operator without much knowledge of printing quality information to set the printing quality suitable for the selected type of media by simply selecting one parameter among the plurality of parameters that represent the printing quality in a stepwise manner.

The second printer control apparatus enables even a non-skilled operator to readily input various pieces of information relating to the printing quality. The structure of the second printer control apparatus does not require data input with respect to a number of items, thereby reducing labor required for data input.

In the second printer control apparatus of the present invention, the print quality specifying means may comprise: display control means for displaying image data representing a specific image, which enables the operator to specify a desired printing quality through an input operation, as quality specification image data on a screen of a display unit; and data input means for inputting data in the specific image in response to the input operation by the operator. In this structure, the range limiting means may be provided with display image data setting means for setting the quality specification image data as image data that represent an image including only the plurality of predetermined parameters as options of the print quality specifying means.

In this structure, the operator carries out data input through the data input means, while examining the quality specification image data displayed on the screen of the display unit. The quality specification image data comprise only the plurality of predetermined parameters set according to the type of media. This structure ensures selection of the printing quality suitable for the selected type of media.

In the second printer control apparatus of the present invention, the media type setting means may comprise media type display control means for displaying image data representing an image, which enables the operator to specify the type of media through an input operation, together with the quality specification image data on the screen of the display unit.

This structure enables a data input group for setting the type of media and a data input group for setting the printing quality to be displayed on the same image, thereby enhancing the operatability of data input by the operator.

The present invention is further directed to a third printer control apparatus for setting various pieces of information required for printing in a predetermined printer. The third printer control apparatus comprises: operation executing means for carrying out an operation to set the various pieces of information, while making an image relating to the operation displayed on a screen of a display unit; and media information display control means for displaying an image, which represents a feed path of paper in the course of printing in the predetermined printer, together with the image displayed by the operation executing means.

In the third printer control apparatus of the present invention, during the operation for setting various pieces of information required for printing, an image representing the feed path of paper in the course of printing in the printer is displayed on the screen of the display unit. This visually informs the operator of not only the surface but the top and bottom or the left and right of paper along the feed path of paper.

The structure of the third printer control apparatus thus enables the operator to readily set the paper in the printer with the correct orientation of the surface and the top and bottom or the left and right of paper for proper printing. This structure prevents the wrong printing and makes the printer easy to use.

In accordance with one preferable application of the third printer control apparatus, the media information display control means displays an image representing orientation of paper set in the predetermined printer, in addition to the feed path.

In this structure, an image representing orientation of paper set in the printer is also displayed on the display unit. This structure enables the operator to readily check the feed path of paper set in a certain direction in the printer.

In accordance with another preferable application of the third printer control apparatus, the media information display control means shows the feed path in a perspective view representing a three-dimensional image of the predetermined printer.

This structure enables the operator to view the feed path three-dimensionally, and clearly informs the operator of the surface of paper set in the printer. The printer control apparatus of this structure makes the printer easier to use.

In accordance with still another preferable application of the third printer control apparatus, the image relating to the operation comprises a data input section that receives data for setting the various pieces of information from an input unit.

The feed path and orientation of paper are displayed during the operation of data input for setting various pieces of information required for printing in the printer. This structure clearly informs the operator of the surface of paper set in the printer during the operation of data input.

The present invention is also directed to a fourth printer control apparatus for setting various pieces of information required for printing in a predetermined printer. The fourth printer control apparatus comprises: operation executing means for carrying out an operation to set the various pieces of information, while making an image relating to the operation displayed on a screen of a display unit; and media information display control means for displaying a perspective view that represents a three-dimensional image of the predetermined printer and specifies a printable area on paper, together with the image displayed by the operation executing means.

In the fourth printer control apparatus of the present invention, the operator can three-dimensionally view the printable area on paper while carrying out the operation for setting various pieces of information required for printing.

This structure clearly informs the operator of the printable area on paper.

The present invention is further directed to a fifth printer control apparatus for setting various pieces of information required for printing in a predetermined printer. The fifth printer control apparatus comprises: operation executing means for carrying out an operation to set the various pieces of information, while making an image relating to the operation displayed on a screen of a display unit; and media information display control means for displaying a perspective view that represents a three-dimensional image of the predetermined printer and specifies a layout of pages on paper, together with the image displayed by the operation executing means.

In the fifth printer control apparatus of the present invention, the operator can three-dimensionally view the layout of pages on paper while carrying out the operation for setting various pieces of information required for printing. This structure clearly informs the operator of the layout of pages on paper.

Part of the above and the other related objects is also realized by a first method of setting various pieces of information required for printing in a predetermined printer. The first method comprises the steps of:

(a) dividing the various pieces of information into a plurality of groups, providing image data that represent a plurality of tabs for various settings, each tab corresponding to each of the plurality of groups, and selecting specific image data of a desired tab among the image data representing the plurality of tabs in response to an external instruction;

(b) displaying the specific image data of the desired tab as display image data on a screen of a display unit; and (c) displaying at least one piece of information, which is selected among plural pieces of information specified in another tab expressed by another set of image data that are different from the specific image data of the desired tab, in a predetermined area of the display image data.

Like the first printer control apparatus, the first method of the present invention enables some pieces of information specified on another tab to be displayed on the screen of the display unit, while the operator carries out the data input operations on the desired tab. The first method significantly reduces the number of change of the tabs displayed on the screen, thereby saving the labor of the operator.

The present invention is also directed to a second method of setting various pieces of print quality information that define printing quality by a predetermined printer as quality control information for controlling the predetermined printer. The second method comprises the steps of:

(a) storing a plurality of parameters that represent the printing quality in a stepwise manner;

(b) storing values of the print quality information that are set corresponding to each of the parameters and determine the printing quality defined by each parameter;

(c) specifying the printing quality desired by an operator by selecting one parameter among the plurality of parameters, in response to an operation of the predetermined printer by the operator;

(d) extracting the values of the print quality information corresponding to the parameter selected in the step (c) from the contents stored in the step (b), and setting the extracted values of the print quality information as the quality control information;

(e) restricting parameters selectable in the step (c) to a plurality of predetermined parameters among the plurality of parameters stored in the step (a);

(f) setting a type of media used in the predetermined printer; and (g) changing the selectable parameters restricted in the step (e) according to the type of media set in the step (f).

Like the second printer control apparatus, the second method of the present invention enables even a non-skilled operator to readily input various pieces of information relating to the printing quality. The structure of the second method reduces labor required for data input.

The present invention is further directed to a third method of setting various pieces of information required for printing in a predetermined printer. The third method comprises the steps of:

(a) carrying out an operation to set the various pieces of information, while making an image relating to the operation displayed on a screen of a display unit; and (b) displaying an image, which represents a feed path of paper in the course of printing in the predetermined printer, together with the image displayed in the step (a).

Like the third printer control apparatus, the third method of the present invention enables the operator to readily set the paper in the printer with the correct orientation of the surface and the top and bottom or the left and right of paper for proper printing. This structure prevents the wrong printing and makes the printer easy to use.

Part of the above and the other related objects is further realized by a first recording medium that represents a computer program product for setting various pieces of information required for printing in a predetermined printer. The computer program product comprises:

a computer readable medium;

first program code means for causing a computer to divide the various pieces of information into a plurality of groups, provide image data that represent a plurality of tabs for various settings, each tab corresponding to each of the plurality of groups, and select specific image data of a desired tab among the image data representing the plurality of tabs in response to an external instruction;

second program code means for causing the computer to display the specific image data of the desired tab as display image data on a screen of a display unit; and third program code means for causing the computer to display at least one piece of information, which is selected among plural pieces of information specified in another tab expressed by another set of image data that are different from the specific image data of the desired tab, in a predetermined area of the display image data, wherein each of the program code means is recorded on the computer readable medium.

The computer carries out the computer programs recorded on the first recording medium. Like the first printer control apparatus and the first method discussed above, the first recording medium of the present invention enables some pieces of information specified on another tab to be displayed on the screen of the display unit, while the operator carries out the data input operations on the desired tab. The first recording medium significantly reduces the number of change of the tabs displayed on the screen, thereby saving the labor of the operator.

The present invention is also directed to a second recording medium that represents a computer program product for setting various pieces of print quality information that define printing quality by a predetermined printer as quality control information for controlling the predetermined printer. The computer program product comprises:

a computer readable medium;

first program code means for causing a computer to store a plurality of parameters that represent the printing quality in a stepwise manner;

second program code means for causing the computer to store values of the print quality information that are set corresponding to each of the parameters and determine the printing quality defined by each parameter;

third program code means for causing the computer to specify the printing quality desired by an operator by selecting one parameter among the plurality of parameters, in response to an operation of the predetermined printer by the operator;

fourth program code means for causing the computer to extract the values of the print quality information corresponding to the parameter selected by the third program code means from the contents stored by the second program code means and to set the extracted values of the print quality information as the quality control information;

fifth program code means for causing the computer to restrict parameters selectable by the third program code means to a plurality of predetermined parameters among the plurality of parameters stored by the first program code means;

sixth program code means for causing the computer to set a type of media used in the predetermined printer; and seventh program code means for causing the computer to change the selectable parameters restricted by the fifth program code means according to the type of media set by the sixth program code means, wherein each of the program code means is recorded on the computer readable medium.

The computer carries out the computer programs recorded on the second recording medium. Like the second printer control apparatus and the second method, the second recording medium of the present invention enables even a non-skilled operator to readily input various pieces of information relating to the printing quality. The structure of the second recording medium reduces labor required for data input.

The present invention is further directed to a third recording medium that represents a computer program product for setting various pieces of information required for printing in a predetermined printer. The computer program product comprises:

a computer readable medium;

first program code means for causing a computer to carry out an operation to set the various pieces of information, while making an image relating to the operation displayed on a screen of a display unit; and second program code means for causing the computer to display an image, which represents a feed path of paper in the course of printing in the predetermined printer, together with the image displayed by the first program code means, wherein each of the program code means is recorded on the computer readable medium.

The computer carries out the computer programs recorded on the third recording medium. Like the third printer control apparatus and the third method, the third recording medium of the present invention enables the operator to readily set the paper in the printer with the correct orientation of the surface and the top and bottom or the left and right of paper for proper printing. This structure prevents the wrong printing and makes the printer easy to use.

These and other objects, features, aspects, and advantages of the present invention will become more apparent from the following detailed description of the preferred embodiment with the accompanying drawings.

BRIEF DESCRIPTION OF THE DRAWINGS

FIG. 23 shows the contents of a map stored in the ROM 31;

FIG. 24 shows images expressed by image data of pic01 to pic08;

FIG. 25 shows images expressed by image data of pic09 to pic12;

FIG. 26 shows an image expressed by image data of pic13;

FIG. 27 shows images expressed by image data of pic14 to pic21;

FIG. 28 shows images expressed by image data of pic22 to pic25;

FIG. 29 shows an image expressed by image data of pic26;

FIG. 30 shows images expressed by image data of pic27 and pic28.

DESCRIPTION OF THE PREFERRED EMBODIMENTS

One mode of carrying out the present invention is discussed below as a preferred embodiment.

1) Structure of Computer System Realizing Printer Control Apparatus

Figure 1:
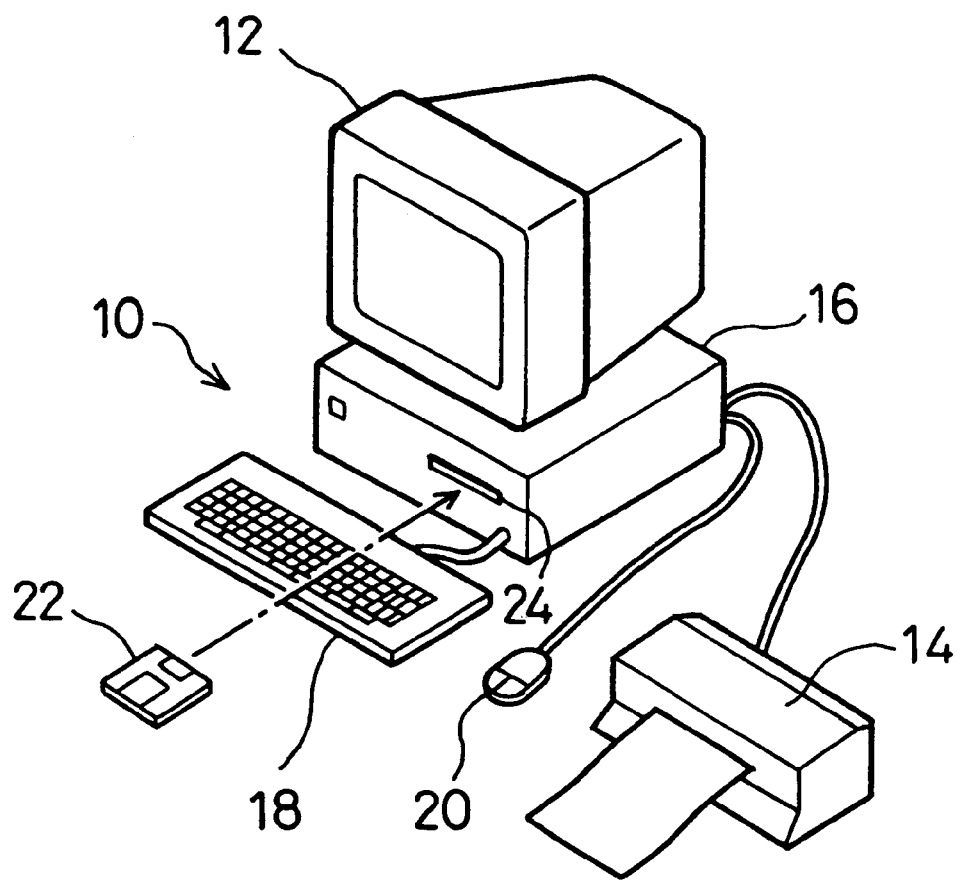
FIG. 1 shows the appearance of a computer system given as a preferred embodiment according to the present invention.

FIG. 1 shows the appearance of a computer system given as a preferred embodiment according to the present invention. The computer system includes a computer 10 as well as a CRT display 12 and a printer 14 as peripheral equipment. The computer 10 includes a computer main body 16, a keyboard 18, and a mouse 20. A floppy disk drive 24 for reading the contents of a floppy disk 22 is mounted in the computer main body 16.

Figure 2:
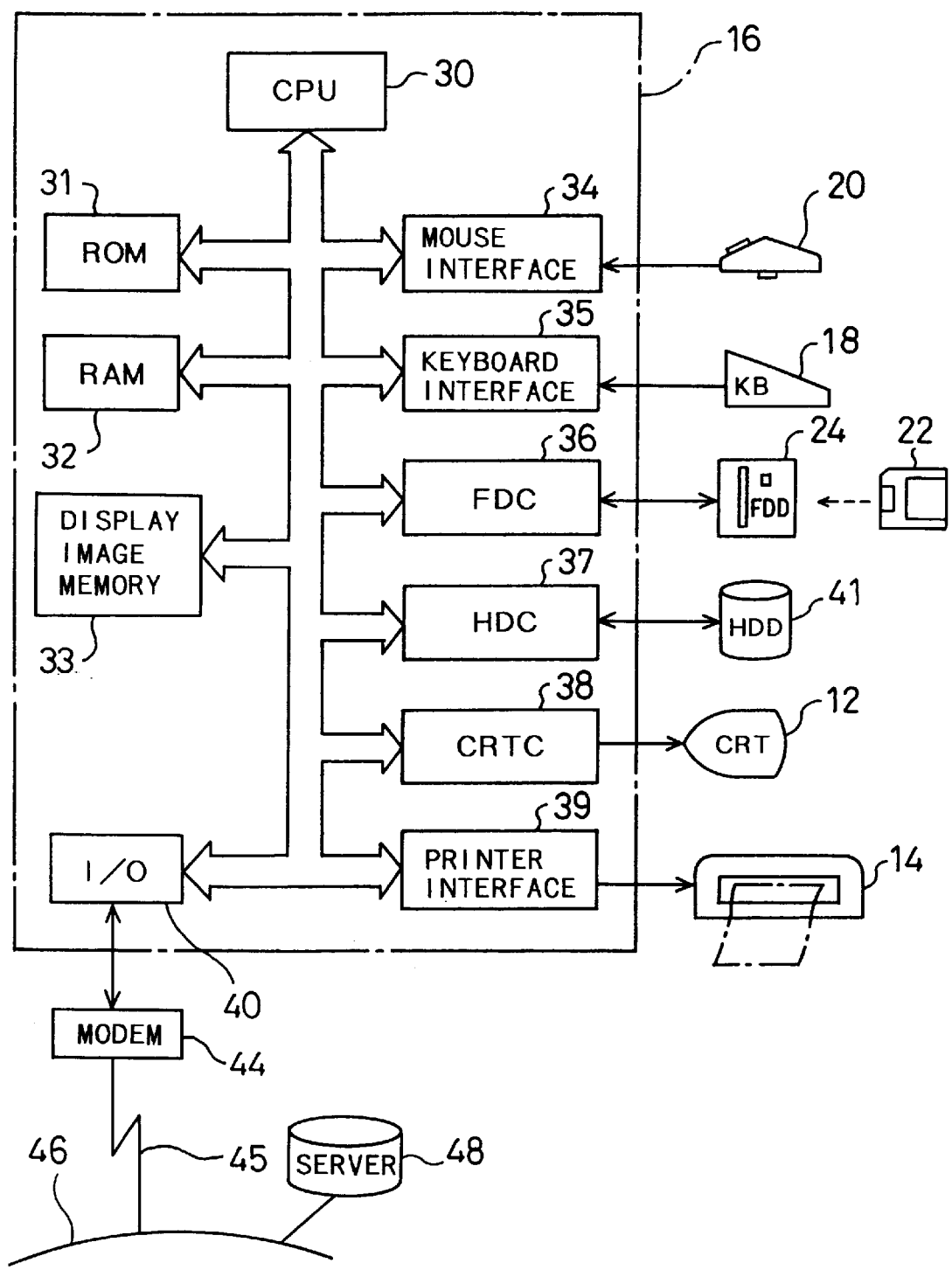
FIG. 2 is a block diagram schematically illustrating the hardware of the computer system.

FIG. 2 is a block diagram schematically illustrating the hardware of the computer system. The computer main body 16 includes a CPU (central processing unit) 30, a ROM (read-only memory) 31, a RAM (random access memory) 32, a display image memory 33, a mouse interface 34, a keyboard interface 35, an FDC 36, an HDC 37, a CRTC 38, a printer interface 39, and an I/O port 40, which are mutually connected via buses.

The ROM 31 permanently stores a variety of programs and data, whereas a variety of data are written into and read from the RAM 32. The display image memory 33 stores display image data representing images displayed on the CRT display 12. The mouse interface 34 receives data from the mouse 20, and the keyboard interface 35 receives key inputs from the keyboard 18. The FDC 36 is a floppy disk controller for controlling the floppy disk drive (FDD) 24, and the HDC 37 is a hard disk controller for controlling a hard disk drive (HDD) 41. The CRTC 38 is a CRT controller for controlling display of images on the CRT display 12, based on the display image data stored in the display image memory 33. The printer interface 39 controls data outputs to the printer 14. The I/O port 40 has a serial output port and is connected to a public telephone network 46 via a modem 44. The computer 10 is accordingly connected to an external network via the modem 44 to enable access to a specific server 48.

In this computer system, an operating system is stored in the HDD 41, and a power supply to the computer main body 16 enables the operating system to be loaded into a predetermined area in the RAM 32 according to a loader written in a boot block of the HDD 41. A printer driver provided for each type of the printer 14 is stored in advance in the floppy disk 22, and is installed on the computer main body 16 via the floppy disk drive 24 based on a predetermined install program. The installed printer driver is stored in the HDD 41, and is incorporated into he operating system and loaded into the predetermined area in he RAM 32 in response to a power supply to the computer main body 16.

The CPU 30 executes the printer driver to realize the respective constituents of the present invention. Although the software program of the printer driver is stored in the floppy disk 22 in this embodiment, it may be stored in another portable recording medium or carriable recording medium, such as a CD-ROM, a magneto-optic disc, or an IC card. The software program may be obtained by downloading program data supplied from the specific server 48 via the connected external network and transferring the program data to either the RAM 32 or the HDD 41.

2) Printing Process

Figure 3:
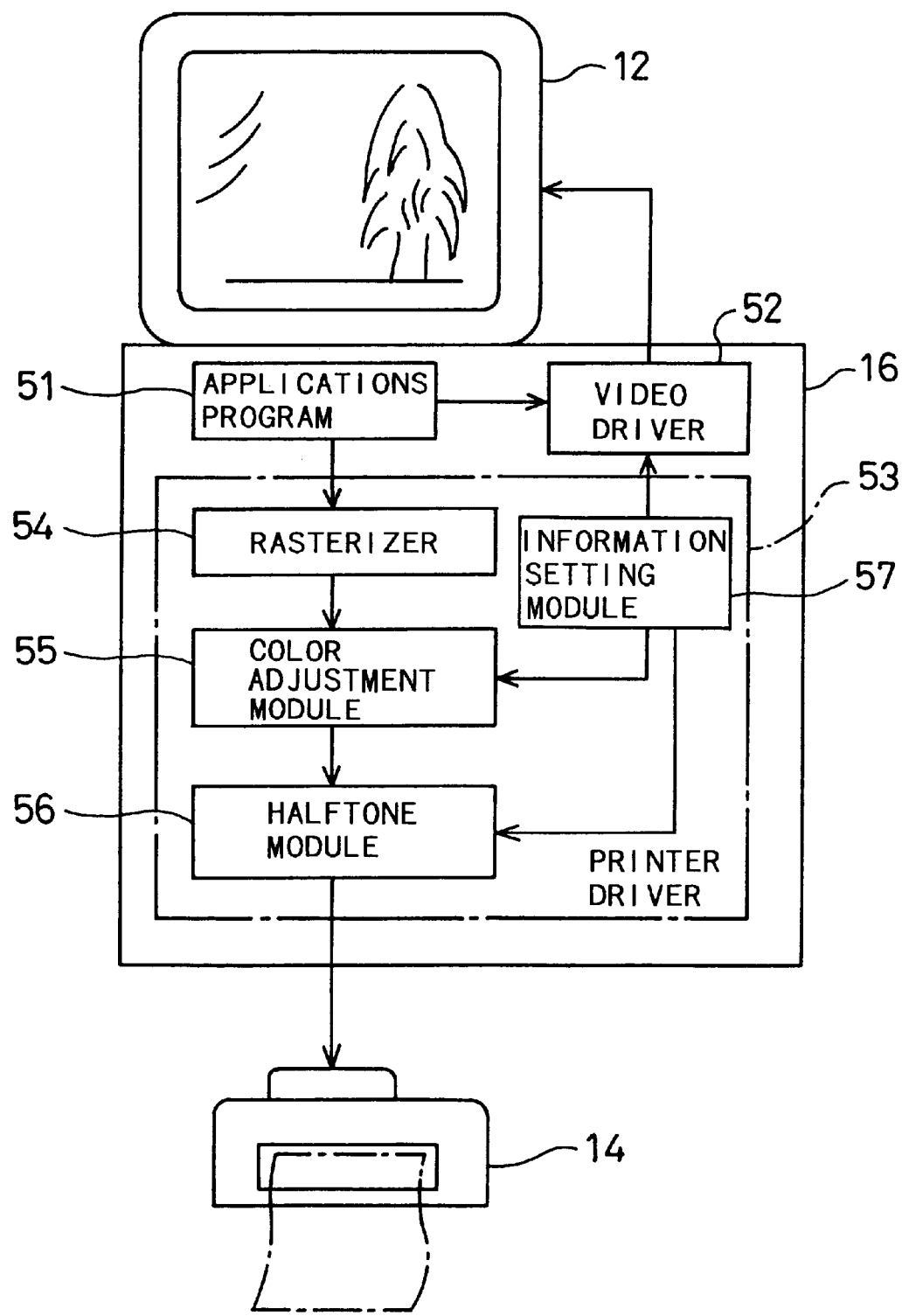
FIG. 3 is a block diagram showing processes carried out by the computer main body 16 for processing image information and printing an image based on the processed image information.

The following describes a printing process by the computer system having the hardware discussed above. FIG. 3 is a block diagram showing processes carried out by the computer main body 16 for processing image information and printing an image based on the processed image information. An applications program 51 running in the computer main body 16 processes an image and displays the processed image on the CRT display 12 via a video driver 52. In response to a printing instruction output from the applications program 51, a printer driver 53 in the computer main body 16 receives image information from the applications program 51 and converts the image information to signals printable by the printer 14.

In the example of FIG. 3, the printer driver 53 includes a rasterizer 54 for converting the image information transmitted from the applications program 51 to color information of every dot, a color adjustment module 55 for causing the image information converted to the color information of every dot (tone data) to be subjected to color adjustment according to the coloring characteristics of the printer 14, and a halftone module 56 for converting the color-adjusted image information to halftone image information that expresses a density of a certain area by existence or non-existence of ink dots. The printer driver 53 further includes an information setting module 57 for setting various pieces of information used for printing by the printer 14. The information used for printing includes pieces of information relating to the main settings of printing, such as printing quality, color adjustment, and the type of halftoning, and those relating to the paper settings, such as the size of paper and the printing orientation.

The information regarding the color adjustment set by the information setting module 57 is sent to the color adjustment module 55, whereas the information regarding the type of halftoning is sent to the halftone module 56. The information setting module 57 displays an image of the settings on the CRT display 12 via the video driver 52. The operations of the respective modules except the information setting module 57 are known to the skilled in the art and are thus not specifically described here, and the following describes the operations of the information setting module 57 in detail.

The printing procedure by the printer 14 is controlled by changing the settings of the printer driver 53. The operator is required to specify the settings in advance, and the information setting module 57 carries out the actual operation for setting various pieces of information used for printing. A view shown on the CRT display 12 through the operation of the information setting module 57 is discussed first. In the following discussion, Windows 95 (trade mark by Microsoft Corporation) is used as the operating system for the printer driver 53.

3) Operations of Printer Driver

The operator operates the computer 10 in the following manner to display a dialog box for setting various pieces of information used for printing on the CRT display 12. The operator first opens a Printer window through 'Start', 'Setting', and 'Printer' operations. The operator then double-clicks an icon representing a specific printer on the Printer window to open a window of the specific printer. The operator subsequently carries out 'Printer' and 'Properties' operations on the window of the specific printer to open a Properties dialog box DB1 for setting various pieces of information regarding the specific printer.

Figure 4:
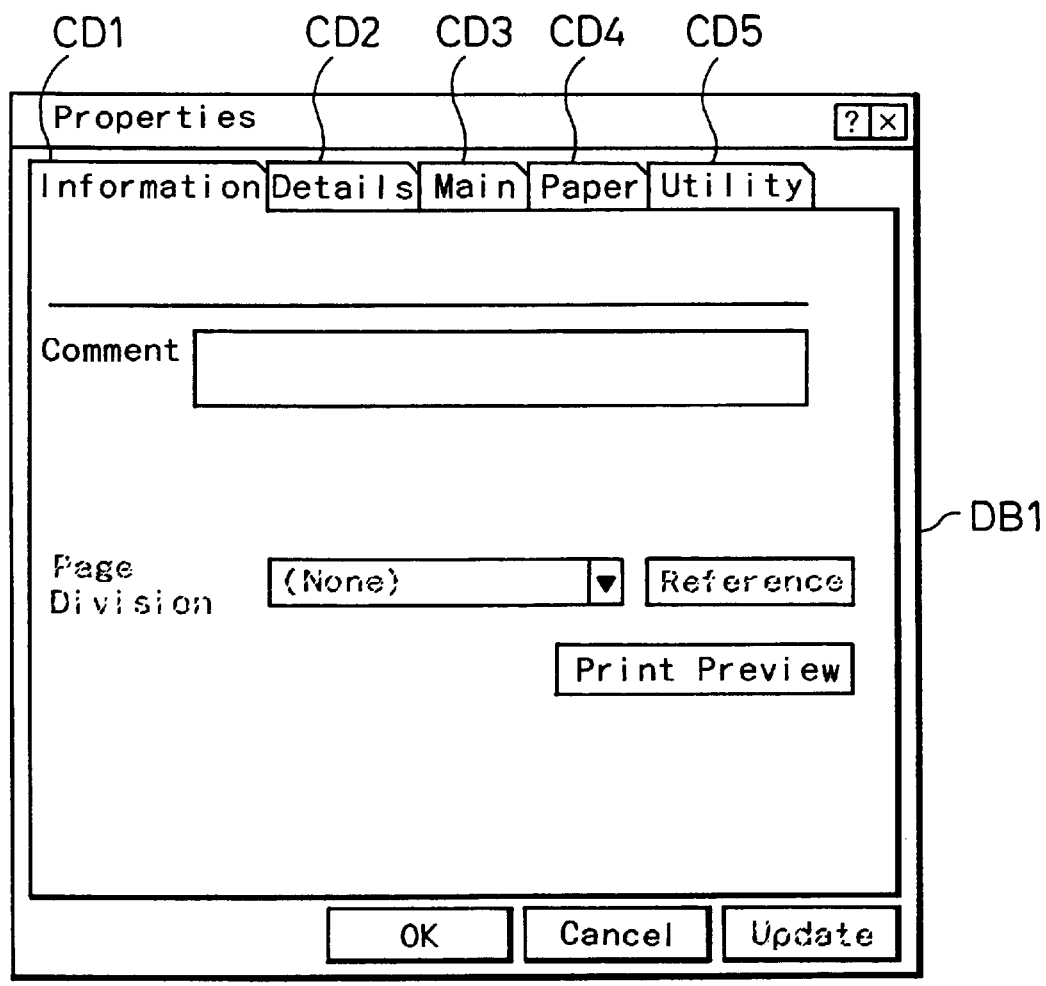
FIG. 4 shows a Properties dialog box DB1 for setting various pieces of information regarding a printer.

FIG. 4 shows the Properties dialog box DB1. The dialog box DB1 has five tabs CD1 'Information', CD2 'Details', CD3 'Main', CD4 'Paper', and CD5 'Utility'. The Information tab CD1 is for setting information regarding the printer, such as Comment on the printer. The Details tab CD2 is for setting detailed information regarding the printer, such as a port connecting with the printer. The Main tab CD3 is for setting primary pieces of information relating to the printing quality. The Paper tab CD4 is for setting various pieces of information regarding paper. The Utility tab CD5 is for setting other useful pieces of information.

The operator selects one of the five tabs CD1 through CD5 through an operation of the mouse 20, and the selected tab is displayed on the dialog box DB1.

4) Display of Main Tab

Figure 5:
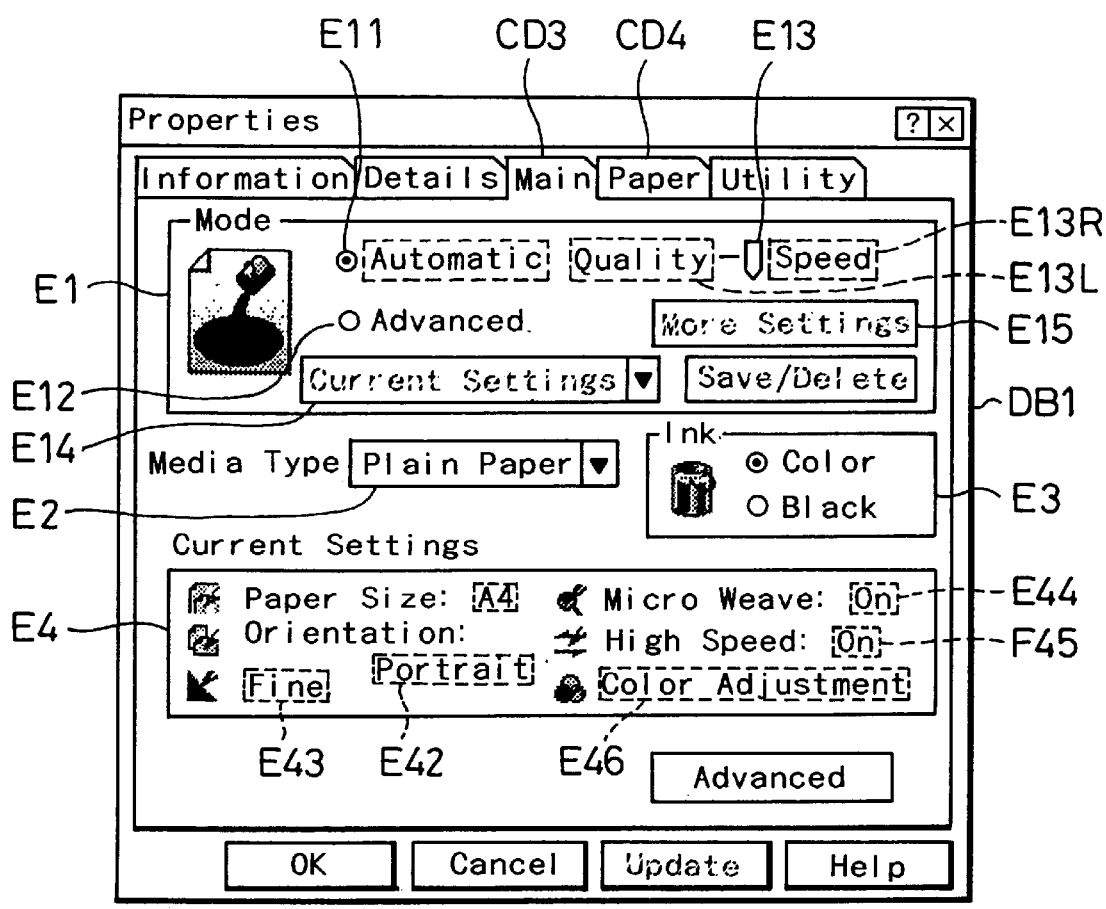
FIG. 5 shows a Main tab CD3 that is open on the Properties dialog box DB1.

FIG. 5 shows the Main tab CD3 that is open on the Properties dialog box DB1. The Main tab CD3 has three data input groups E1 'Mode', E2 'Media Type', and E3 'Ink' to allow data inputs from the operator. The Main tab CD3 also has a data display section E4 for showing several pieces of information representing the current settings of the printer driver.

The Mode group E1 specifies a main setting mode and is selectable between an Automatic mode for automatic settings and an Advanced mode for customized settings by clicking either one of option buttons E11 and E12.

When the operator clicks the option button E12 to select the Advanced mode, a text box E14 and a More Settings button E15 become active. The operator can input the printing object in the text box E14 and open a dialog box DB2 for customized settings by clicking the More Settings button E15.

The text box E14 specifies the type of data to be printed and has options including WP (word processing), Graph, and Photo.

Figure 6:
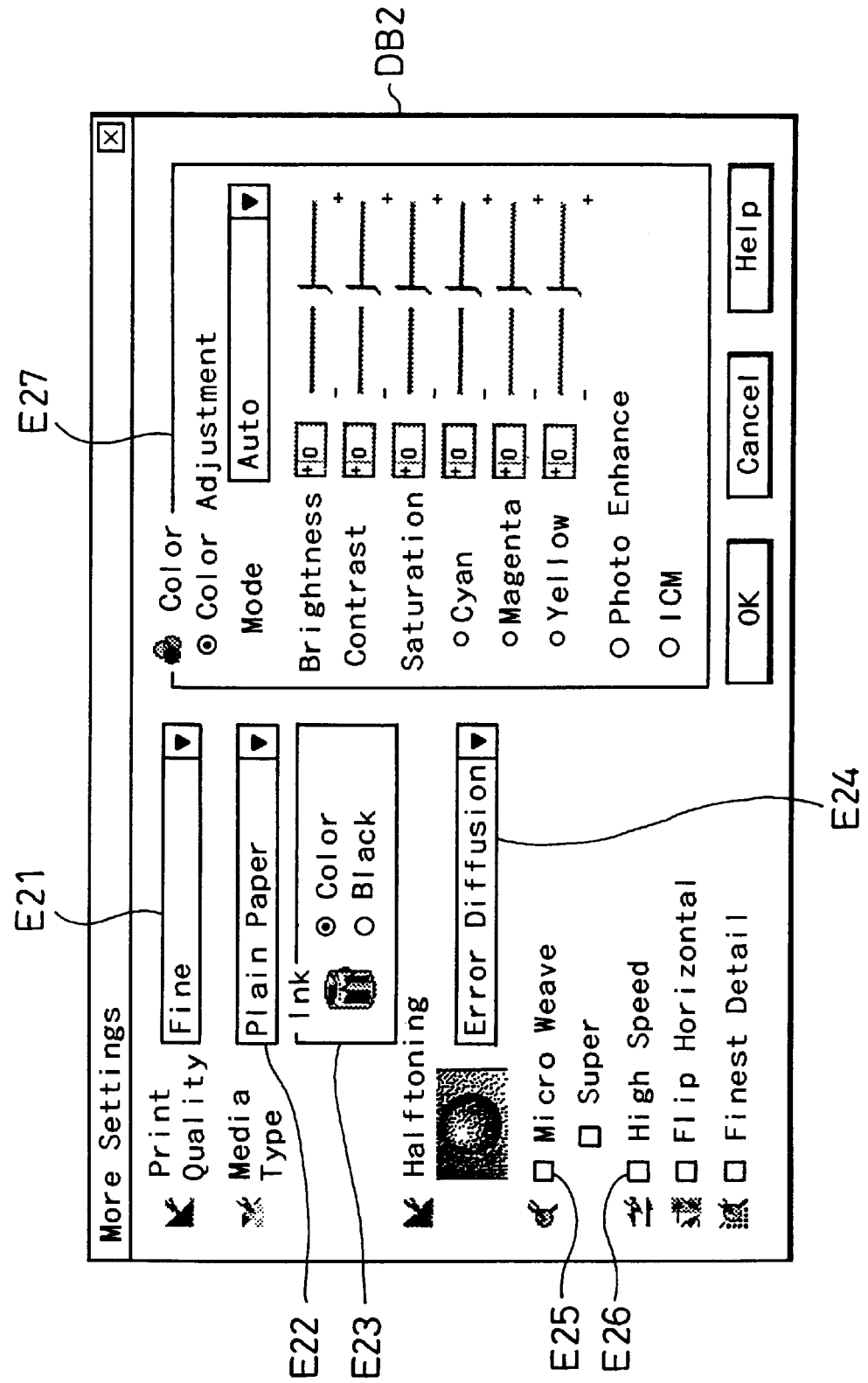
FIG. 6 shows a More Settings dialog box DB2.

FIG. 6 shows the dialog box DB2 for customized settings that is opened by clicking the More Settings button E15. The dialog box DB2 has data input groups E21 'Print Quality', E22 'Media Type', E23 'Ink', E24 'Halftoning', E25 'Micro Weave', E26 'High Speed', and E27 'Color'.

The Print Quality text box E21 specifies the resolution of printing and has a drop-down list including three options Draft, Fine, and Superfine. The options Draft, Fine, and Superfine respectively represent resolutions of 360×360 (dots), 720×360 (dots), and 720×720 (dots).

The Media Type text box E22 specifies the type of media and has a drop-down list including three options Plain Paper, Photo Quality Ink Jet Paper, and Photo Quality Glossy Paper. The Ink group E23 specifies the type of ink used in the printer 14 and has two options Color and Black. The Media Type text box E2 and the Ink group E3, which are identical with the Media Type text box E22 and the Ink group E23, are also found on the Main tab CD3. The later inputs are always preferential and the display of the former inputs is changed by the later inputs.

The Half toning text box E24 specifies the type of half toning and has a drop-down list including two options Fine Dithering and Error Diffusion. Information regarding the type of halftoning is used in the halftone module 56 (see FIG. 3). The Micro Weave check box E25 is for on and off the micro weave function. The micro weave function provided for the printer 14 causes different heads to scan on an identical line and print one dot in an overlapping manner, thereby enhancing the printing quality. The High Speed check box E26 is for on and off the high speed printing function. The high speed printing function provided for the printer 14 causes different heads to scan in reverse directions, thereby enhancing the printing speed.

The Color group E27 specifies various pieces of information regarding color adjustment and has three option buttons Color Adjustment, Photo Enhance, and ICM. The operator can also set the intensities of the brightness, contrast, and saturation in the Color group E27.

When the operator clicks the option button E11 in the Mode group E1 to select the Automatic mode, a slide lever button E13 becomes active. The operator can specify the quality of printing by the printer 14.

As shown in FIG. 5, the slide lever button E13 is movable between Quality and Speed. The operator can select either Quality or Speed by dragging the slide lever of the slide lever button E13 with the mouse 20. These two parameters Quality and Speed are given as the options selectable by the slide lever button E13 when the operator chooses Plain Paper using the Media Type drop-down list box E2. In case that other types of media are chosen among the Media Type drop-down list box E2, two parameters are arbitrarily selected among the group consisting of High Quality, Quality, Standard, and Speed. The parameter Speed means a high printing speed but a little poor printing quality and is accordingly one of the parameters defining the printing quality.

The parameters High Quality, Quality, Standard, and Speed specify the printing quality in a stepwise manner. When the operator chooses one parameter using the slide lever button E13 in the Automatic mode, the computer 10 executes the processing for obtaining various pieces of quality information that determine the printing quality, based on the selected parameter. The various pieces of quality information include the resolution of printing, the type of halftoning, and the on/off of the micro weave function. These pieces of information are identical with those included in the information input in the dialog box DB2 for customized settings. The concrete procedure of specifying such pieces of information will be discussed later.

The data display section E4 includes display areas E41, E42, E43, E44, E45, and E46 for displaying information regarding Paper Size, Orientation, Print Quality, MicroWeave, High Speed, and Color. The data of Paper Size and Orientation displayed in the display areas E41 and E42 are input on the Paper tab CD4, which will be discussed later.

The data of Print Quality, Micro Weave, High Speed, and Color displayed in the display areas E43, E44, E45, and E46 are set in the following manner. In case that the operator selects the Advanced mode in the Mode group E1, data set in the dialog box DB2 for customized settings are displayed in the display areas E43 through E46. More concretely the data selected among the Print Quality drop-down list box E21, the data specified in the Micro Weave check box E25, the data specified in the High Speed check box E26, and the data input in the Color group E27 are displayed in the display areas E43, E44, E45, and E46, respectively.

In case that the operator selects the Automatic mode in the Mode group E1 as shown in FIG. 5, on the other hand, the data automatically set based on the parameter of the printing quality that has been selected by dragging the slide lever 10 button E13 are displayed in the Print Quality display area E43 and the Micro Weave display area E44. The option OFF that represents the off state of the high speed function is displayed in the High Speed display area E45 and the option Color Adjustment in the Color display area E46.

5) Display of Paper Tab

Figure 7:
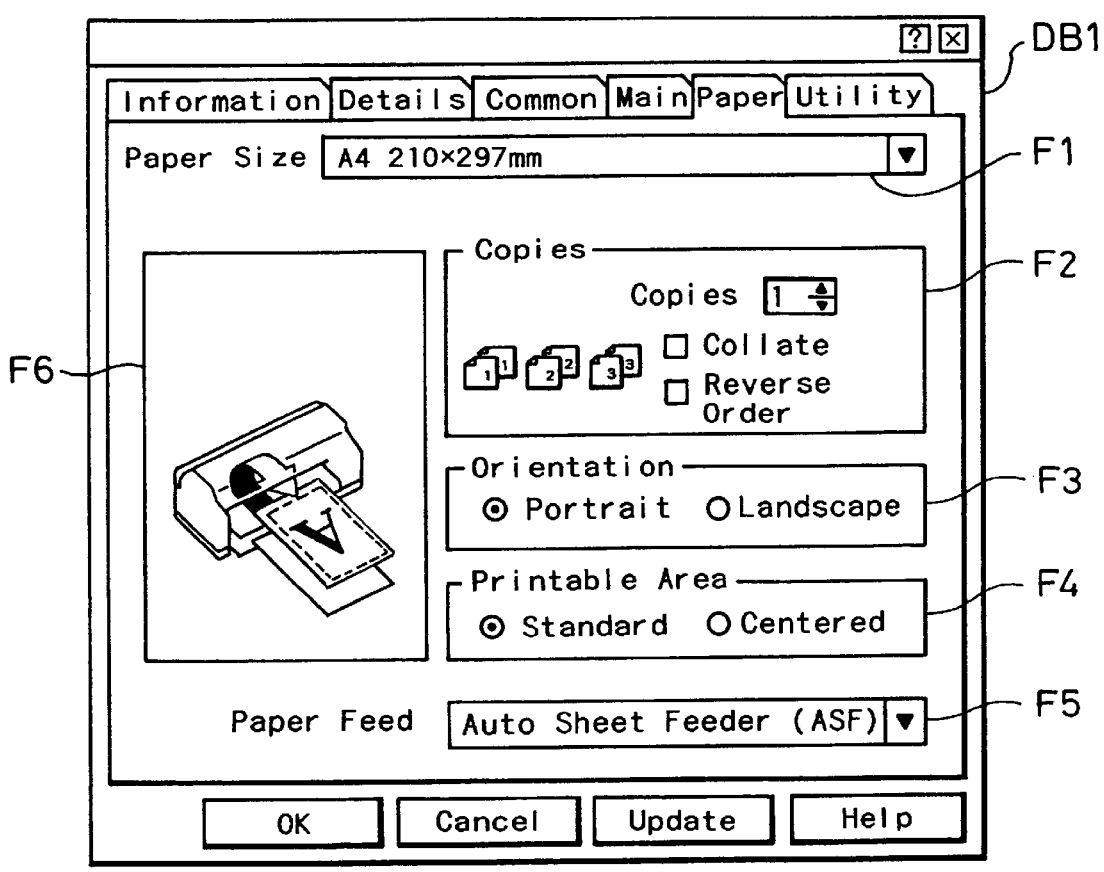
FIG. 7 shows a Paper tab CD4 in one state, which is open on the Properties dialog box DB1.

FIG. 7 shows the Paper tab CD4 that is open on the Properties dialog box DB1. The Paper tab CD4 has five data input groups F1 'Paper Size', F2 'Copies', F3 'Orientation', F4 'Printable Area', and F5 'Paper Feed' and a data display section F6 for showing a three-dimensional image of the printer 14 as a perspective view.

The Paper Size text box F1 specifies the type and the size of paper and has a drop-down list of several options including 'A4 210×297 mm', 'A4 lateral 210×297 mm', 'Envelop 120×235 mm', and 'Post Card 100×147 mm'.

The Copies group F2 specifies the required number of copies and has Collate and Reverse Order check boxes for setting the collating sort and selecting either the normal order and the reverse order.

Figure 8A:
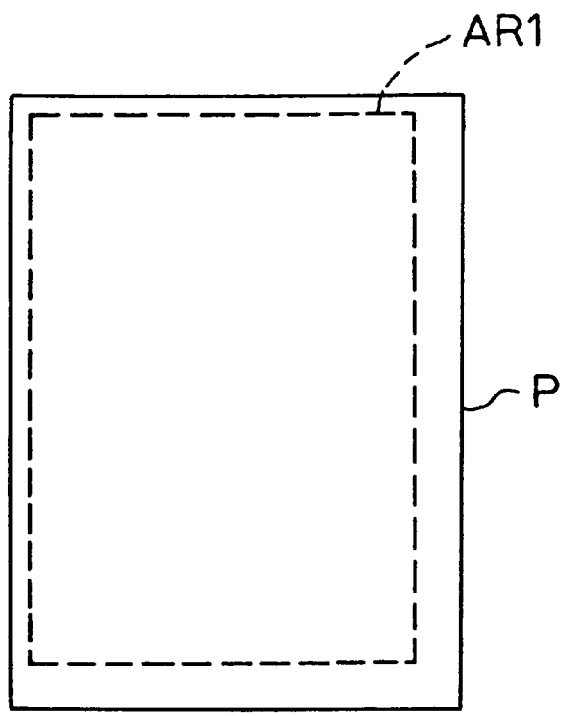
FIGS. 8(a) and 8(b) show printable areas in the Standard mode and in the Centered mode.
Figure 8B:
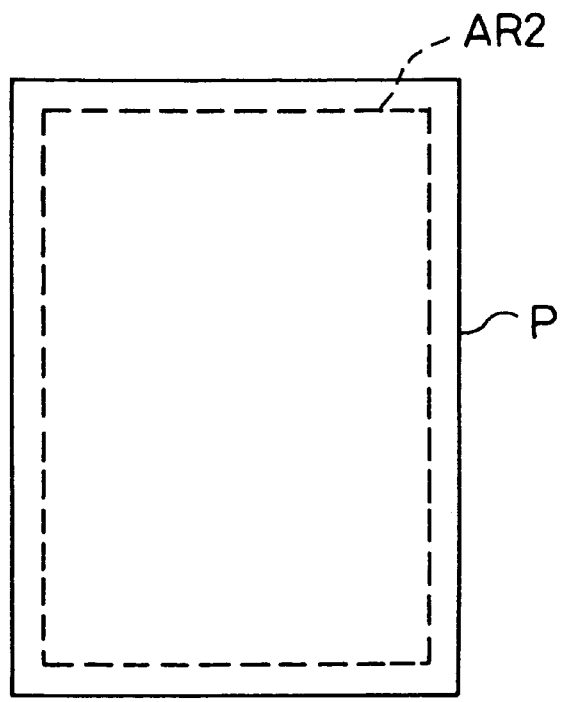

The Orientation group F3 specifies the printing orientation on the paper and is selectable between Portrait and Landscape. The Printable Area group F4 specifies the printable area in the paper and is selectable between Standard and Centered. The option Standard represents a printable area AR1 that has large margins on the lower and right sides of paper P as shown in FIG. 8(*a*). The option Centered represents a printable area AR2 that has equal margins on all the upper, lower, right, and left sides of the paper P as shown in FIG. 8(*b*). The large margins on the lower and the right sides of the paper P shown in FIG. 8(*a*) are made by the mechanism of the printer 14. Namely the margin on the lower side is ascribed to the fact that the area is out of the working range of the sheet feed roller of the printer 14, and the margin on the right side to the carriage return.

Figure 9:
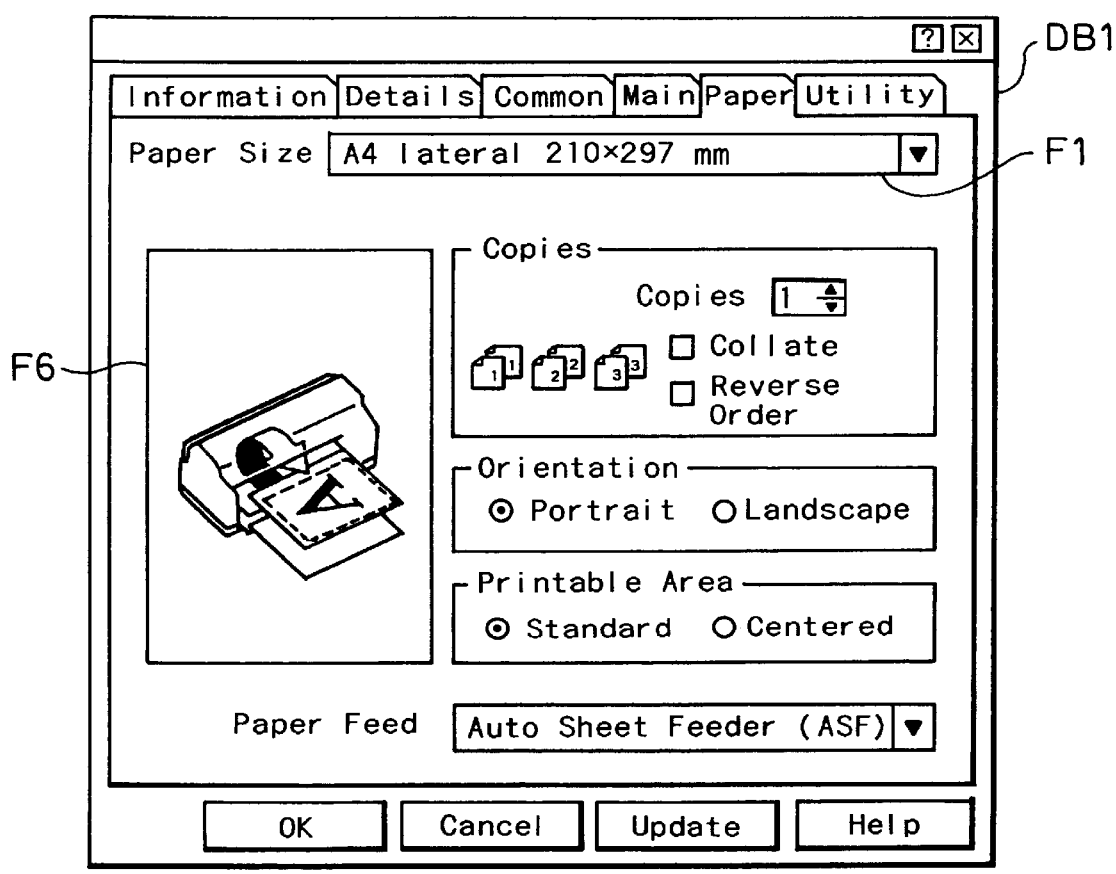
FIG. 9 shows the Paper tab CD4 in another state, which is open on the Properties dialog box DB1.

The Paper Feed text box F5 specifies the method of feeding paper to the printer 14 and has a drop-down list including three options ASF (Auto Sheet Feeder), Tractor Feeder, and Manual. The data display section F6 shows the three-dimensional image of the printer 14 as a perspective view to inform the operator of the printing conditions in the printer 14. The perspective view includes the following contents:

(1) Type and Size of Paper
(2) Direction of Paper Set
(3) Feed Path of Paper for Printing
(4) Printing Orientation On Paper
(5) Printable Area in Paper The perspective view showing the above items (1) through (5) is changed according to the settings in the data input groups F1 through F5. By way of example, in case that the option 'A4 210×297 mm' is selected among the Paper Size drop-down list box F1, the paper having a size corresponding to A4 is set in the vertical direction in the perspective view of the printer displayed in the data display section F6 as shown in FIG. 7. In case that the option 'A4 lateral 210×297 mm' is selected among the Paper Size drop-down list box F1, on the other hand, the paper having a size corresponding to A4 is set in the lateral direction in the perspective view of the printer displayed in the data display section F6 as shown in FIG. 9. The details of the settings and the display will be discussed later.

The data specified using the Paper Size drop-down list box F1 and the data selected in the Orientation group F3 are displayed in the Paper Size display area E41 and the Orientation display area E42 of the data display section E4 when the operator opens the Main tab CD3.

The CPU 30 carries out a processing routine in the information setting module 57 of the printer driver 53 to display images on the CRT display 12. The following describes the processing routine in the information setting module 57.

6) Processing Routine of Information Setting Module

Figure 10:
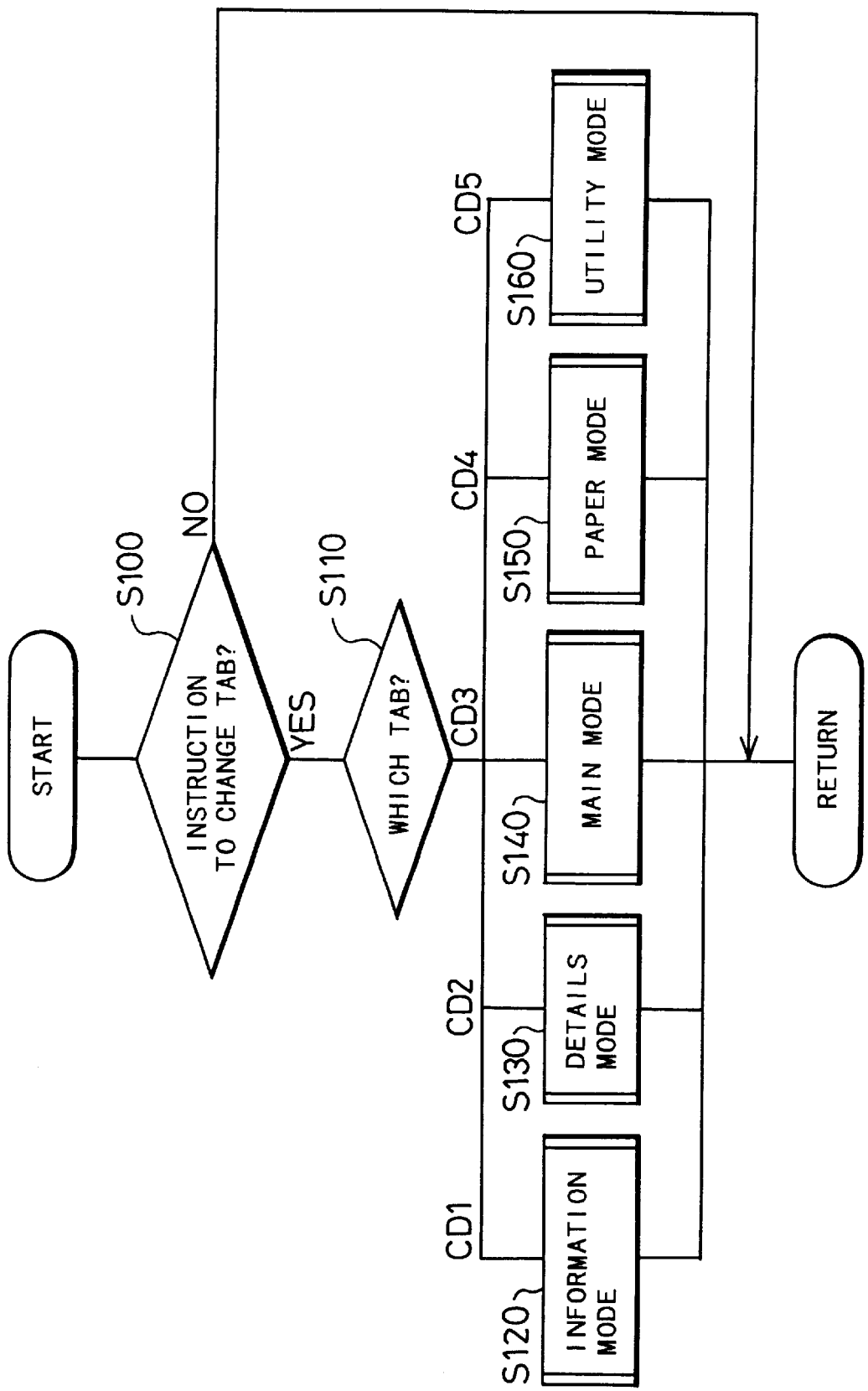
FIG. 10 is a flowchart showing a processing routine in the information setting module 57 carried out by the CPU 30.

FIG. 10 is a flowchart showing the processing routine in the information setting module 57. This processing routine is repeatedly executed at predetermined time intervals. When the program enters the routine of FIG. 10, the CPU 30 first determines whether or not an instruction is given to change the active tab among the five tabs CD1 through CD5, Information, Details, Main, Paper, and Utility at step S100. The active tab here means the tab displayed on the CRT display 12 to wait for the data inputs. The operator can give the instruction to change the active tab by clicking the index of the tabs with the mouse 20.

When it is determined that no instruction is given to change the active tab at step S100, the program immediately goes to RETURN and exits from this routine. When it is determined that an instruction is given to change the active tab at step S100, on the other hand, the program goes to step S110 to specify the new active tab among the five tabs CD1 through CD5, Information, Details, Main, Paper, and Utility. The program then carries out a processing routine in a selected mode corresponding to the new active tab, that is, a processing routine in one of the Information mode, Details Mode, Main mode, Paper mode, and Utility mode, at one of steps S120 through S160. The program then goes to RETURN and exits from this routine.

7) Processing Routine in Main Mode

Figure 11:
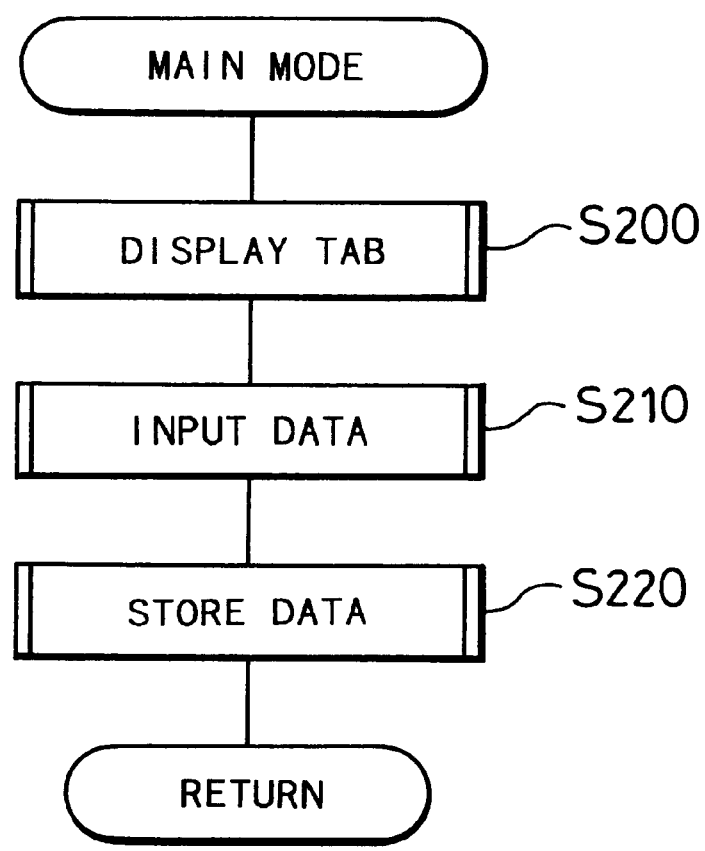
FIG. 11 is a flowchart showing a processing routine in the Main mode executed by the CPU 30.

FIG. 11 is a flowchart showing the processing routine in the Main mode executed at step S140 in the flowchart of FIG. 10. When the program enters the routine of FIG. 11, the CPU 30 executes a tab display routine for displaying image data representing the Main tab CD3 on the CRT display 12 at step S200. The CPU 30 then receives a variety of input data in response to the data input operations of the keyboard 18 and the mouse 20 by the operator who checks the image data in the Main tab displayed on the CRT display 12 at step S210, and stores the variety of input data at predetermined positions on the RAM 32 at step S220.

For example, the image data of the Main tab CD3 shown in FIG. 5 are displayed on the CRT display 12 at step S200. The operator checks the image data displayed on the CRT display 12 and, for example, selects the option Quality by dragging the slide lever button E13. The CPU 30 then receives the data Quality in response to this selection at step S210, and stores the data Quality at predetermined positions on the RAM 32 at step S220. The data Quality here represent pieces of information defining the printing quality in the Automatic mode, and include 720×720 (Superfine) as the data of Output Resolution, ON as the data of Micro Weave, and Error Diffusion as the data of Halftoning, which are respectively stored at predetermined positions on the RAM 32. The concrete procedure of storing the information on printing quality will be discussed later. After the storage of data, the program goes to RETURN and exits from this routine in response to a click of the OK button in the displayed image of FIG. 5 by the operator.

8) Tab Display Routine

Figure 12:
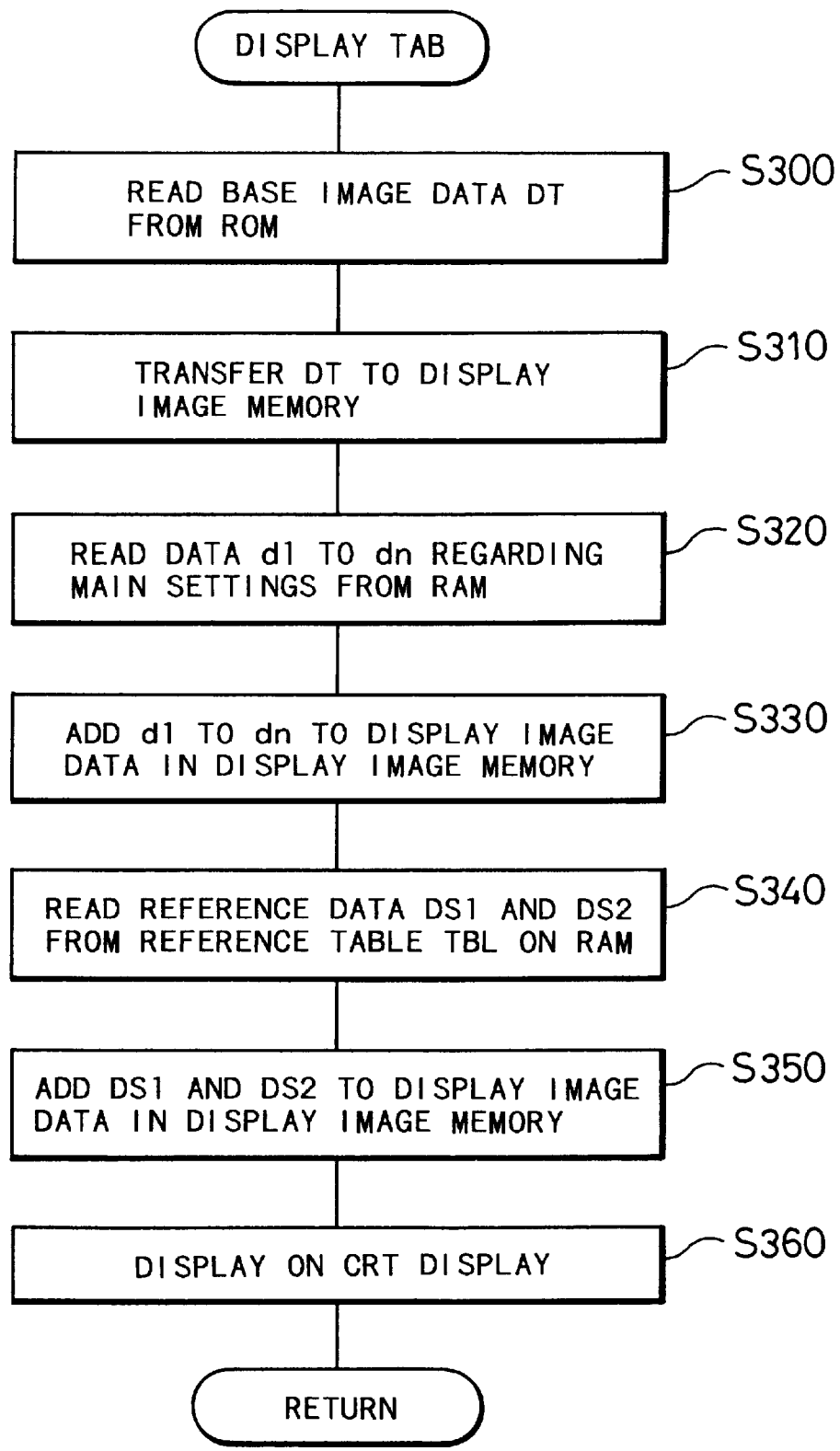
FIG. 12 is a flowchart showing a tab display routine executed by the CPU 30.
Figure 13:
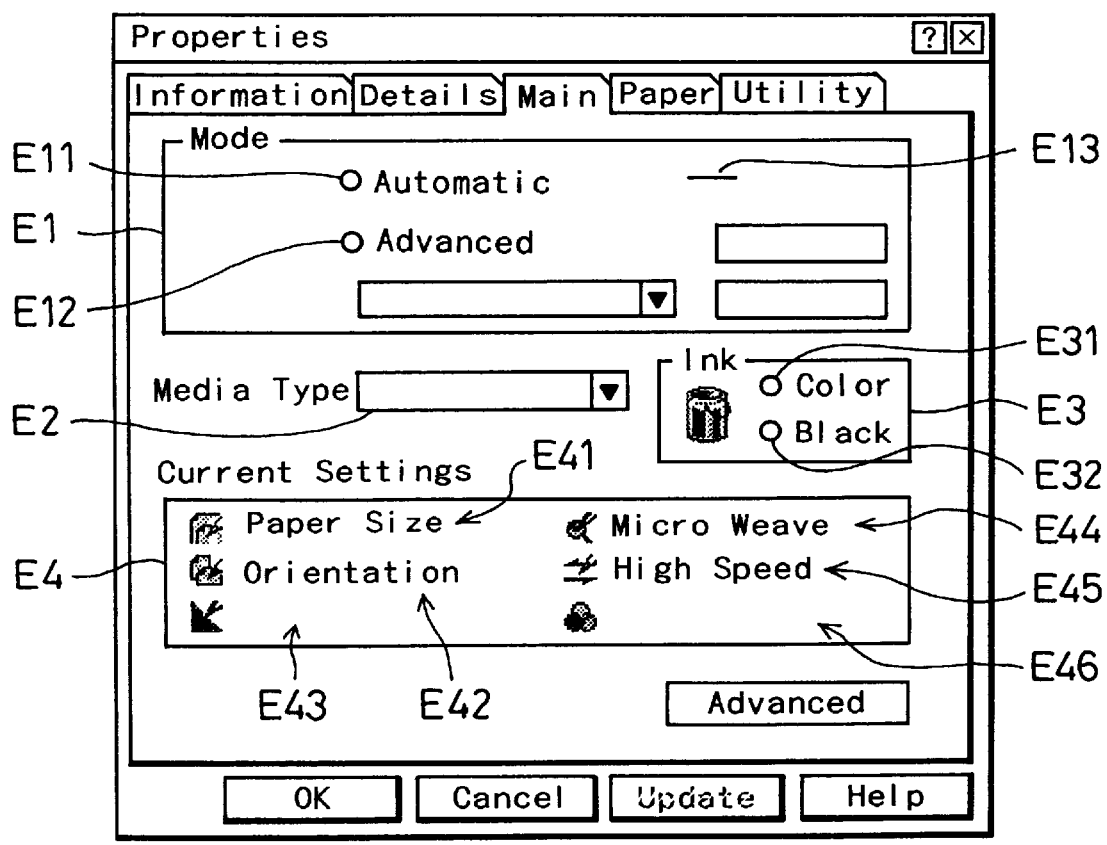
FIG. 13 shows an image expressed by base image data.

FIG. 12 is a flowchart showing the tab display routine executed at step S200 in the flowchart of FIG. 11. When the program enters the routine of FIG. 12, the CPU 30 first reads base image data DT representing a base image of the Main tab CD3 from the ROM 31 at step S300 and transfers the base image data DT to the display image memory 33 at step S310. The base image data DT represent a base image that excludes variable data sections specified by the input data from the displayed image of the Main tab CD3 shown in FIG. 5. FIG. 13 illustrates this base image. The base image leaves vacant the option buttons E11 and E12 and the slide lever button E13 in the Mode group E1, the Media Type text box E2, option buttons E31 and E32 in the Ink group E3, and the display areas E41 through E46 in the data display section E4. The base image data DT are transferred as display image data to the display image memory 33 at step S310.

The CPU 30 subsequently reads a variety of data d1 to dn (wherein n denotes an arbitrary positive numeral) regarding the main settings specified in the Main tab CD3 in the previous processing cycle from the RAM 32 at step S320, and adds the input data d1 to dn to a predetermined area of the display image data stored in the display image memory 33 at step S330. The display image data stored in the display image memory 33 accordingly represent an image including characters and pictures added to the option buttons E11 and E12 and the slide lever button E13 in the Mode group E1, the Media Type text box E2, and the option buttons E31 and E32 in the Ink group E3 shown in FIG. 13, based on the input data d1 to dn. The display areas E43, E44, E45, and E46 for displaying information regarding the Print Quality, Micro Weave, High Speed, and Color in the data display section E4 also include characters based on the input data d1 to dn. Data relating to the display areas E43 through E46 have been input as part of the data d1 to dn in the dialog box DB2 for customized settings that is open on the Main tab CD3, and specify the pieces of information displayed in the display areas E43, E44, E45, and E46.

Figure 14:
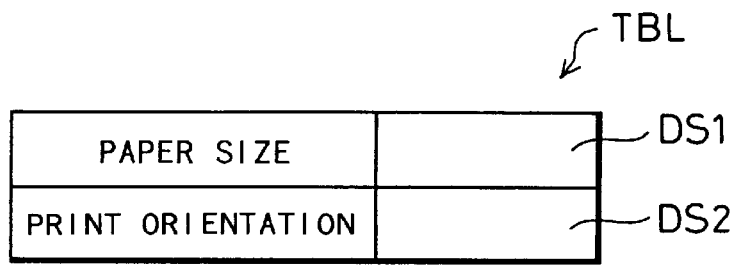
FIG. 14 shows data structure of a reference table TBL.

The CPU 30 then reads reference data DS1 and DS2 from a reference table TBL stored in the RAM 32 at step S340. FIG. 14 shows data structure of the reference table TBL. The reference table TBL includes the first reference data DS1 representing the size of paper and the second reference data DS2 representing the printing orientation. The values in the reference table TBL are updated in the following manner.

Figure 15:
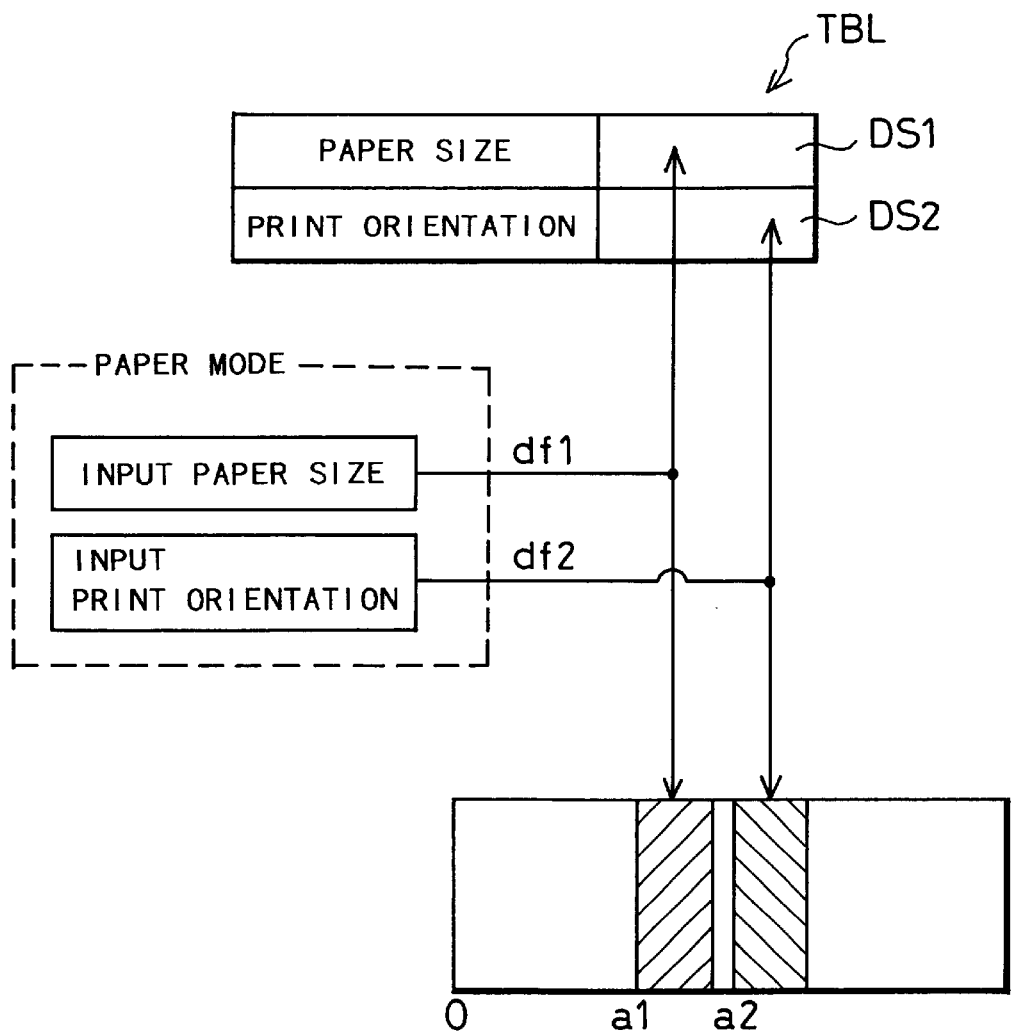
FIG. 15 shows a process of updating the reference table TBL.

FIG. 15 shows a process of updating the reference table selection of the Paper tab CD4, the CPU 30 reads data df1 regarding the size of paper from the Paper Size box F1 and data df2 regarding the printing orientation from the Orientation group F3. The input data df1 regarding the size of paper are stored into an area starting from an address a1 in the RAM 32, and the input data df2 regarding the printing orientation into an area starting from an address a2 in the RAM 32. At the same time, the data df1 regarding the size of paper are registered into the first reference data DS1 in the reference table TBL, and the data df2 regarding the printing orientation into the second reference data DS2 in the reference table TBL. In this manner, the reference data DS1 and DS2 in the reference table TBL are updated every time when the Paper Size and the Orientation are input in the Paper mode.

Referring back to the flowchart of FIG. 12, after reading the reference data DS1 and DS2 from the reference table TBL at step S340, the CPU 30 adds the input reference data DS1 and DS2 to a predetermined area of the display image data stored in the display image memory 33 at step S350. The display image data 15 stored in the display image memory 33 accordingly represent an image including characters based on the reference data DS1 and DS2 in the Paper Size display area E41 and the Orientation display area E42 in the data display section E4.

At subsequent step S360, the CRTC 38 controls display of an image on the CRT display 12 based on the display image data stored in the display image memory 33. As a result, the image of the Main tab CD3 including the characters and pictures added to the parts E11 through E13, E2, E31, E32, and E41 through E46, for example, as shown in FIG. 5 is displayed on the CRT display 12. After execution of step S360, the program goes to RETURN and exits from this routine.

The process of data input discussed above is then carried out on the Main tab CD3 displayed on the CRT display 12 (step S210 in the flowchart of FIG. 11).

The tab display routine adds the data of Paper Size and Orientation specified on the Paper tab CD4 to a predetermined area of the image data representing the Main tab CD3 (that is, the composite data of the base image data DT and the image data corresponding to part of the data d1 to dn) and displays an image corresponding to the resulting image data on the CRT display 12.

While the operator carries out the data input on the Main tab CD3 displayed on the CRT display 12, this structure informs the operator of the data of Paper Size and Orientation specified on the Paper tab CD4. This significantly decreases the number of switching operations that select one of the tabs CD1 through CD5 for the display and thereby saves the labor of the operator who operates the mouse 20 for switching the display. This printer driver 53 is accordingly easy to use.

In the structure of this embodiment, the Main tab CD3 displayed on the CRT display 12 includes the data specified in the dialog box DB2 for customized settings that is open on the Main tab CD3. While carrying out the data input on the Main tab CD3, the operator can accordingly check plural pieces of information specified in the dialog box DB2 for customized settings without opening the dialog box DB2. This significantly decreases the number of switching operations between the Main tab CD3 and the dialog box DB2 for customized settings and thereby saves the labor of the operator who operates the mouse 20 for switching the display.

In the structure of this embodiment, the data of Paper Size and Orientation specified on the Paper tab CD4 are displayed on the Main tab CD3. In accordance with one modified structure, data specified on the Details tab CD2 or the Utility tab CD5 may be displayed on the Main tab CD3, or data specified on a plurality of tabs, for example, on the Paper tab CD4 and the Details tab CD2, may be displayed on the Main tab CD3.

In this embodiment, the Paper Size display area E41 and the Orientation display area E42 simply display the input data. In accordance with another preferable structure, the display areas E41 and E42 may have a switching function for changing the display to the Paper tab CD4. When the operator wants to change the input data specified on the Paper tab CD4 and displayed on the Main tab CD3, this structure enables the Paper tab CD4 to be opened by simply clicking the corresponding display area. The printer driver having this structure is easier to use.

9) Processing Routine for Display of Slide Lever Button

As discussed previously, the CPU 30 adds the data d1 to dn to the display image data in the display image memory 33 at step S330 of the tab display routine shown in FIG. 12 to display the Main tab CD3. The display for the slide lever button E13 specifically follows the processing routine discussed below.

Figure 16:
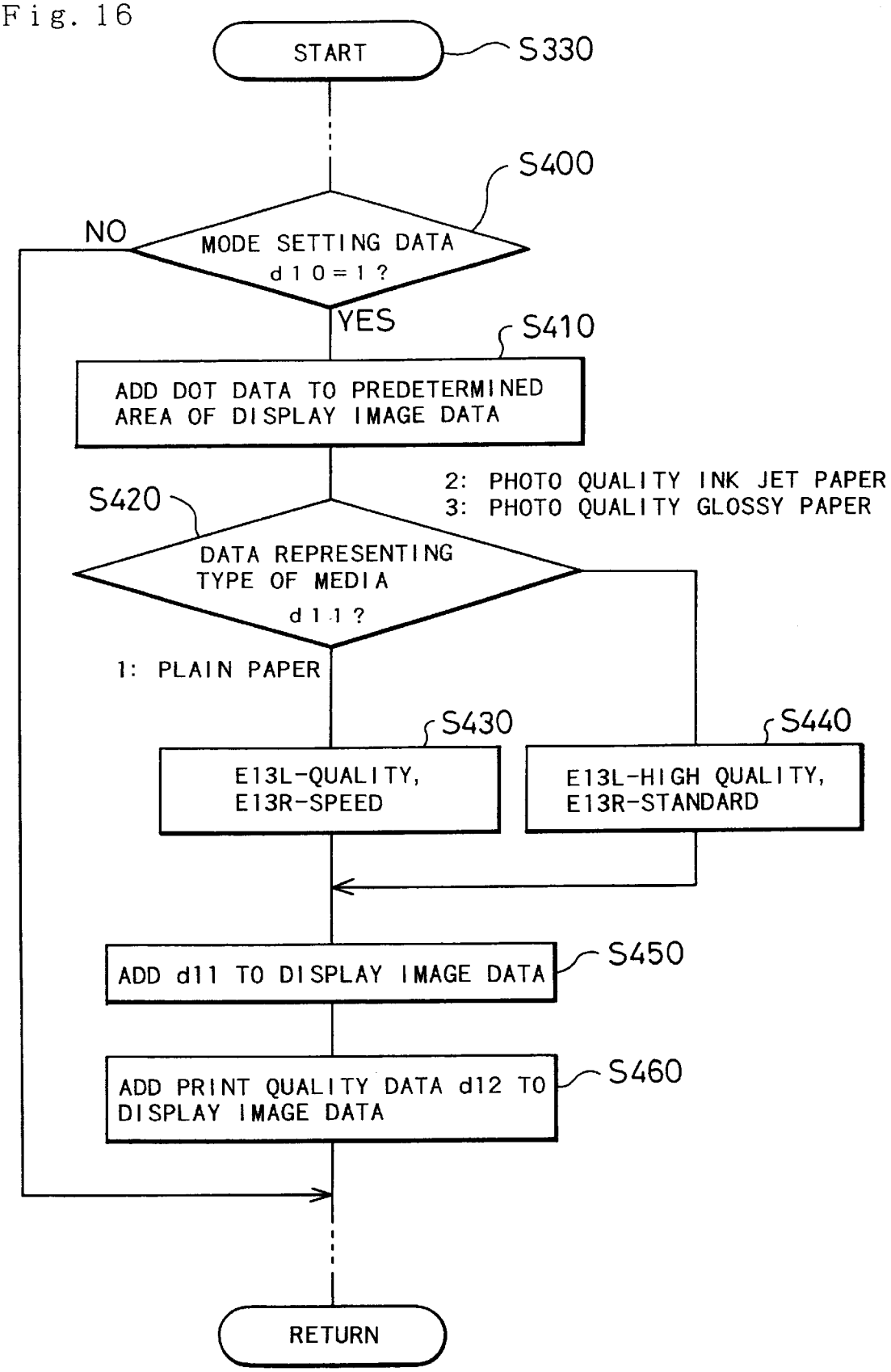
FIG. 16 is a flowchart showing part of step S330 in the tab display routine of FIG. 12.

FIG. 16 is a flowchart showing part of the processing carried out at step S330 in the flowchart of FIG. 12. In the middle of the processing at step S330, the CPU 30 determines whether or not mode setting data d10 is set equal to one at step S400. The mode setting data d10 denotes the selection out of the Automatic mode and the Advanced mode. The value '1' set to the mode setting data d10 shows that the Automatic mode is selected. When it is determined at step S400 that the mode setting data d10 is not equal to one, that is, the Automatic mode is not selected, the program immediately goes to RETURN and concludes the processing of step S330.

Figures 17, 18:
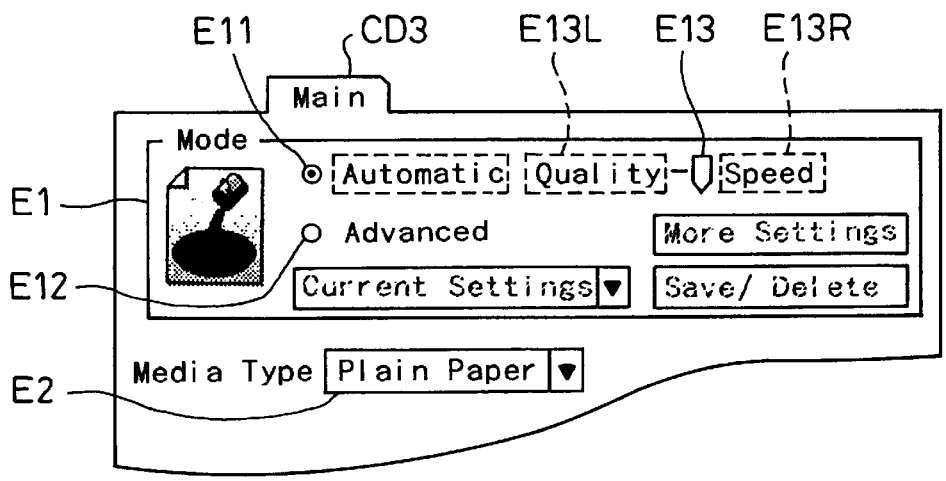
FIG. 17 shows a display around a slide lever button E13 when Plain Paper is selected as the type of media.
FIG. 18 shows data structure of a print quality table TBL2.

When it is determined at step S400 that the mode setting data d10 is equal to one, that is, the Automatic mode is selected, on the other hand, the CPU 30 adds data representing a dot to a predetermined area of the display image data stored in the display image memory 33 at step S410, in order to display a dot in the option button E11 as shown in FIG. 17. The CPU 30 subsequently identifies the value of media type data d11 representing the Media Type at step S420. In case that the media type data d11 is equal to the value '1' representing Plain Paper, the program goes to step S430.

At step S430, the CPU 30 adds character data to a predetermined area of the display image data in the display image memory 33, in order to display the characters 'Quality' in a left-side display box E13L and 'Speed' in a right-side display box E13R of the slide lever button E13 as shown in FIG. 17.

The characters 'Quality' and 'Speed' are selected among a plurality of parameters written in a print quality table TBL2 stored in advance in the ROM 31 (that is, the parameters specifying the printing quality in a stepwise manner discussed previously). FIG. 18 shows data structure of the print quality table TBL2 functioning as the first storage means and the second storage means of the present invention. The print quality table TBL2 has four parameters High Quality, Quality, Standard, and Speed that specify the printing quality in a stepwise manner. The output resolution, the state of the micro weave function, and the condition of halftoning are registered for the respective parameters in a table form. In case that the selected Media Type is Plain Paper, Quality and Speed are selected among the four available parameters High Quality, Quality, Standard, and Speed as the characters displayed in the left-side and right-side display boxes E13L and E13R of the slide lever button E13.

Figure 19:
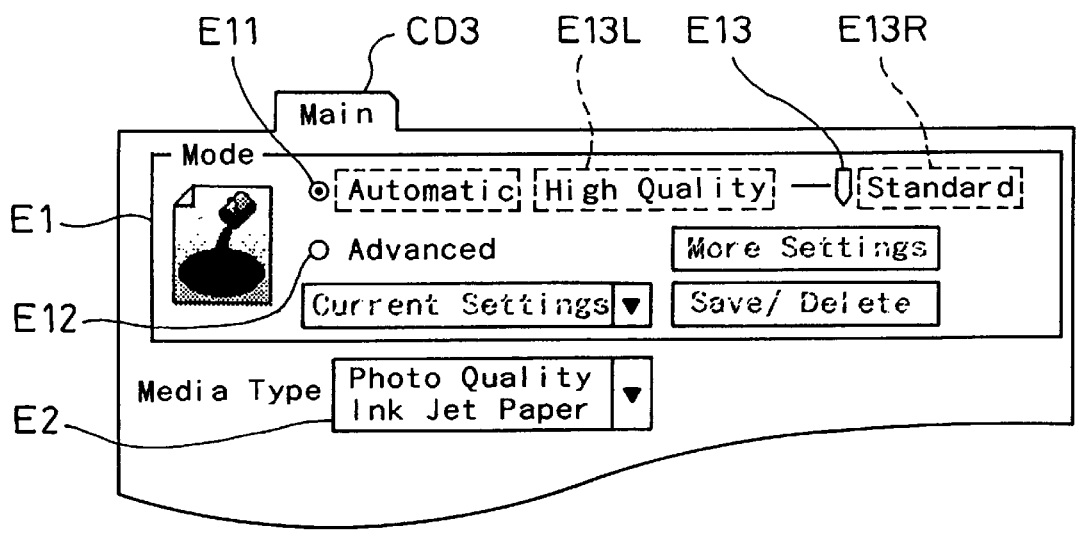
FIG. 19 shows a display around a slide lever button E13 when Photo Quality Ink Jet Paper is selected as the type of media.
Figure 20:
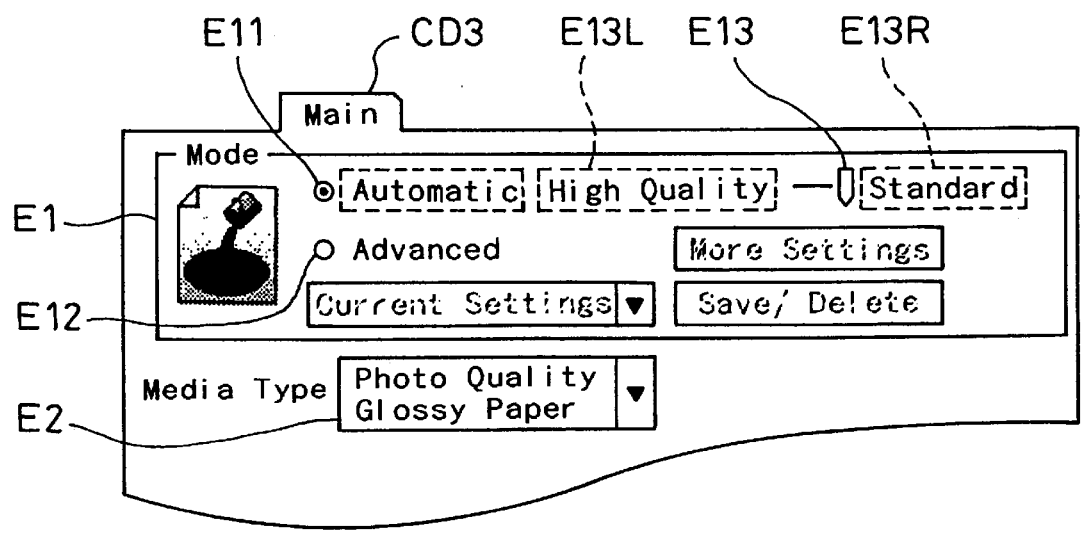
FIG. 20 shows a display around a slide lever button E13 when Photo Quality Glossy Paper is selected as the type of media.

When it is determined at step S420 that the media type data d11 is equal to either the value '2' representing Photo Quality Ink Jet Paper or the value '3' representing Photo Quality Glossy Paper, on the other hand, the CPU 30 adds character data to a predetermined area of the display image data in the display image memory 33, in order to display the characters 'High Quality' in the left-side display box E13L and 'Standard' in the right-side display box E13R of the slide lever button E13 as shown in FIGS. 19 and 20 at step S440.

The characters 'High Quality' and 'Standard' are selected among the plurality of parameters that specify the printing quality and are written in the print quality table TBL2. In case that the selected Media Type is either Photo Quality Ink Jet Paper or Photo Quality Glossy Paper, High Quality and Standard are selected among the four available parameters High Quality, Quality, Standard, and Speed as the characters displayed in the left-side and right-side display boxes E13L and E13R of the slide lever button E13.

After the processing of either step S430 or step S440, the CPU 30 adds the media type data d11 to a predetermined area of the display image data stored in the display image memory 33, in order to display a series of characters representing the media type in the Media Type text box E2 at step S450. The CPU 30 subsequently adds image part data based on print quality data d12 representing the printing quality (that is, image data representing an image part corresponding to the slide lever) to a predetermined area of the display image data, in order to display the slide lever of the slide lever button E13 at a selected position based on the print quality data d12 at step S460. The program then goes to RETURN and concludes the processing of step S330.

As discussed above, the CPU 30 inputs various data at step S210 of the processing routine in the Main mode shown in the flowchart of FIG. 11. The data input of the slide lever button E13 specifically follows the following procedure.

Figure 21:
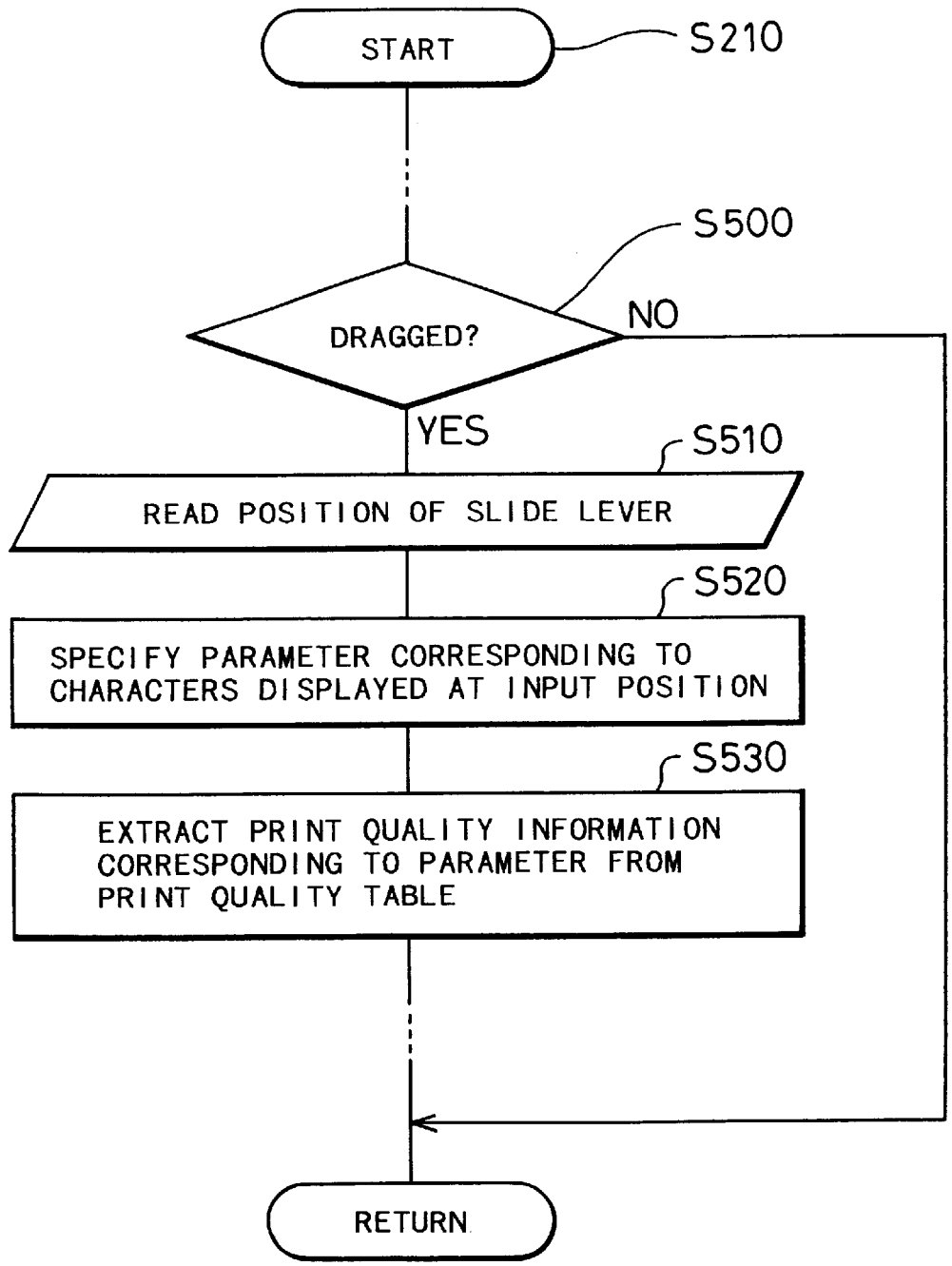
FIG. 21 is a flowchart showing part of step S210 in the processing routine in the Main mode shown in the flowchart of FIG. 11.

FIG. 21 is a flowchart showing part of the processing carried out at step S210 in the flowchart of FIG. 11. In the middle of the processing at step S210, the CPU 30 determines whether or not the operator drags the slide lever button E13 with the mouse 20 at step S500. In case that the slide lever button E13 is not dragged, the program goes to RETURN and concludes the processing of step S210.

When it is determined that the slide lever button E13 is dragged at step S500, the program goes to step S510 to read positional information of the slide lever button E13 specified by the dragging operation. The CPU 30 then specifies the parameter corresponding to the series of characters displayed at the position corresponding to the input positional information (oneofHighQuality, Quality, Standard, and Speed) as a selected parameter by the operator at step S520. The CPU 30 subsequently refers to the print quality table TBL2 using the selected parameter as the key of retrieval, so as to extract print quality information corresponding to the selected parameter at step S530. For example, when the selected parameter is Quality, the CPU 30 extracts the print quality information corresponding to the parameter Quality, that is, the output resolution of 720×720, the ON state of Micro Weave, and the Error Diffusion as the half toning condition, from the print quality table TBL2 shown in FIG. 18.

The program then goes to RETURN and concludes the processing of step S210. The print quality information extracted at step S530 is stored at the predetermined positions on the RAM 32 at step S220 in the flowchart of FIG. 11.

According to the processing routine of FIG. 16, the selected series of characters are displayed on both sides of the slide lever button E13 on the Main tab CD3. The selected series of characters depend upon the type of media. When Plain Paper is selected as the Media Type, Quality and Speed are displayed on either side of the slide lever button E13. When either Photo Quality Ink Jet Paper or Photo Quality Glossy Paper is selected as the Media Type, High Quality and Standard are displayed. According to the processing routine of FIG. 21, the CPU 30 reads the position of the slide lever button E13 dragged by the operator, selects the parameter corresponding to the specified position, and extracts the print quality information according to the selected parameter.

This structure does not require the operator to have any special knowledge on the print quality information, but enables the operator to select the print quality suitable for the selected type of media by simply selecting one of the parameters, High Quality, Quality, Standard, and Speed, that represent the printing quality in a stepwise manner.

As discussed above, the computer system of the embodiment enables even an unskilled operator to readily input the required pieces of print quality information and reduces the labor of the operator for the data input.

In this embodiment, the Media Type text box E2 for inputting the type of media and the slide lever button E13 for selecting the desired printing quality exist on the Main tab CD3. The operator can specify various pieces of print quality information by simply inputting these two data. This structure facilitates the data input operation and reduces the labor of the operator.

In this embodiment, the paper media setting means specifies the type of media in response to the key input by the operator. In accordance with another possible structure, the paper media setting means may specifies the type of media in response to a signal that represents the type of media and is transmitted from and external computer.

10) Display Change Routine for Changing Display of Perspective View on Paper Tab The following describes the details of display of the perspective view in the data display section F6 on the Paper tab CD4. The display of the perspective view in the data display section F6 is changed every time when the settings in the data input groups F1 through F5 are varied. In order to change the display of the perspective view, the CPU 30 carries out a predetermined processing routine in the information setting module 57 of the printer driver 53. The following describes a display change routine for changing the display of the perspective view.

Figure 22:
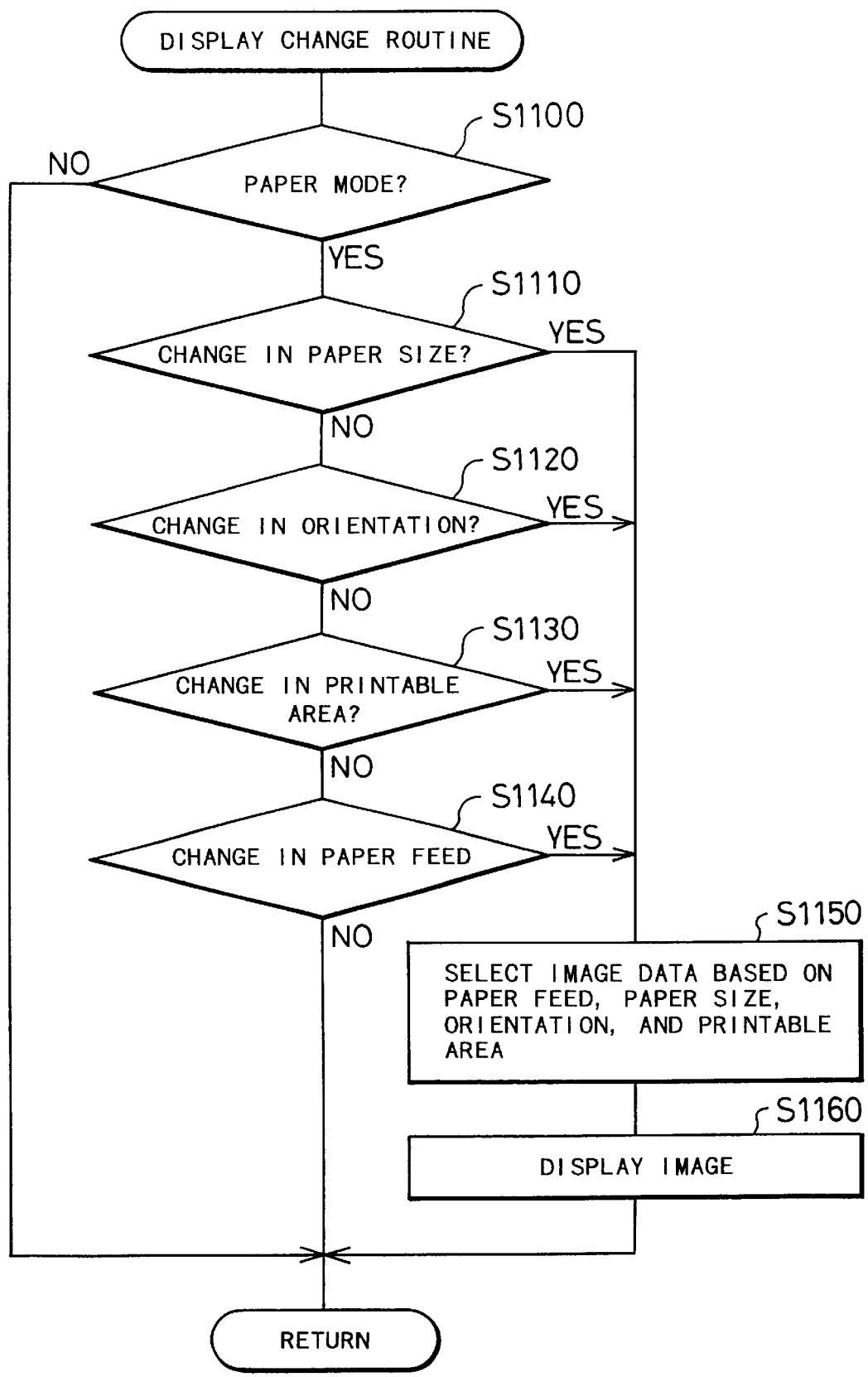
FIG. 22 is a flowchart showing a display change routine carried out by the CPU 30.

FIG. 22 is a flowchart showing the display change routine, which is repeatedly executed at predetermined time intervals. When the program enters the routine of FIG. 22, the CPU 30 first determines whether or not the Paper tab CD4 is open to set the Paper mode on the Properties dialog box DB1 at step S1100. In case that the Paper mode is not selected, the program immediately goes to RETURN and exits from this routine.

When it is determined at step S1100 that the Paper mode is selected, on the other hand, the CPU 30 determines whether or not any change is found in at least one of the data input groups F1, F3, F4, and F5 for setting the Paper Size, Orientation, Printable Area, and Paper Feed at steps S1110 through S1140. In case that no change is found in any of the data input groups F1, F3, F4, and F5, the program goes to RETURN and exits from this routine. In case that any change is found in at least one of the data input groups F1, F3, F4, and F5, on the other hand, the program goes to step S1150 to select image data based on the settings in the data input groups F5 'Paper Feed', F1 'Paper Size', F3 'Orientation', and F4 'Printable Area'.

The concrete processing carried out at step S1150 includes two steps. At a fist step, the CPU 30 refers to a map previously stored in the ROM 31 and specifies the name of image data corresponding to the settings in the data input groups F5, F1, F3, and F4, that is, the data d5 regarding the method of paper feeding, the data d1 regarding the size of paper, the data d3 regarding the printing orientation, and the data d4 regarding the printable area. At a second step, the CPU 30 extracts a predetermined combination of image data corresponding to the specified name from the image data stored in the ROM 31 and stores the extracted image data in a certain work area on the RAM 32.

FIG. 23 shows the contents of the map stored in the ROM 32 as an example. In this map, Auto Sheet Feeder (ASF) is a first option as the data d5 regarding the method of paper feeding. There are three options 'A4 210×297 mm', 'A4 lateral 210×297 mm', and 'Envelop 120×235 mm' as the data d1 regarding the size of paper, which are combinable with the option ASF. There are two options Portrait and Landscape as the data d3 regarding the printing orientation, which are combinable with each of the three options 'A4 210×297 mm', 'A4 lateral 210×297 mm', and 'Envelop 120×235 mm'. There are two options Standard and Centered as the data d4 regarding the printable area, which are combinable with each of the two options Portrait and Landscape. This gives 3×2×2=12 combinations, to which names pic01 through pic12 of image data are allocated respectively.

A name pic13 of image data is allocated to a combination including ASF as the data d5 regarding the method of paper feeding, 'Post Card 100×147 mm' as the data d1 regarding the size of paper, Portrait as the data d3 regarding the printing orientation, and Standard as the data d4 regarding the printable area.

A second option as the data d5 regarding the method of paper feeding is Manual. Thirteen combinations of the paper size data d1, the printing orientation data d3, and the printable area data d4, which are identical with the image data pic01 through pic13, are provided for the option Manual, and names pic14 through pic26 of image data are allocated to these thirteen combinations.

The map further includes Tractor Feeder as a last option of the data d5 regarding the method of paper feeding. The paper size data d1 and the printable area data d4 are fixed to Continuous Paper and Standard with respect to the option Tractor Feeder, and there are two options Portrait and Landscape as the data d3 regarding the printing orientation. Names pic27 and pic28 of image data are allocated to these two combinations.

The CPU 30 refers to this map and specifies the name of image data corresponding to the data d5, d1, d3, and d4 regarding the method of paper feeding, the size of paper, the printing orientation, and the printable area. The image data having the specified name is then extracted from the image data stored in advance in the ROM 31.

FIGS. 24 through 30 show images expressed by the 28 combinations of image data pic01 through pic28. FIG. 24 shows images expressed by the 8 combinations of image data pic01 through pic08, which include the option Auto Sheet Feeder (ASF) as the paper feed data d5 and the options 'A4 210×297 mm' and 'A4 lateral 210×297 mm' as the paper size data d1. In all the images expressed by the image data pic01 through pic08, paper inserted from a front lower portion of the printer 14 is inverted to face up in the printer 14 and discharged from a front upper portion of the printer 14 as shown by the arrows representing the feed path. The paper is set either in the vertical direction or in the lateral direction according to the paper size data d1. The character 'A' printed on the paper is oriented either in the vertical direction (Portrait) or in the lateral direction (Landscape) according to the printing orientation data d3. The rectangle shown by the broken line on the paper is positioned either on the center or out of the center according to the printable area data d4.

FIG. 25 shows images expressed by the 4 combinations of image data pic09 through pic12, which include the option Auto Sheet Feeder (ASF) as the paper feed data d5 and the option 'Envelop 120×235 mm' as the paper size data d1. In all the images expressed by the image data pic09 through pic12, paper inserted from a front lower portion of the printer 14 is inverted to face up in the printer 14 and discharged from a front upper portion of the printer 14 as shown by the arrows representing the feed path. The character 'A' printed on the paper is oriented either in the vertical direction (Portrait) or in the lateral direction (Landscape) according to the printing orientation data d3. The rectangle shown by the broken line on the paper is positioned either on the center or out of the center according to the printable area data d4.

FIG. 26 shows an image expressed by the image data pic13 that includes the option Auto Sheet Feeder (ASF) as the paper feed data d5 and the option 'Post Card 100×147 mm' as the paper size data d1. In the image expressed by the image data pic13, paper inserted from a front lower portion of the printer 14 is inverted to face up in the printer 14 and discharged from a front upper portion of the printer 14 as shown by the arrow representing the feed path. The printing orientation on the post card is Portrait.

FIG. 27 shows images expressed by the 8 combinations of image data pic14 through pic21, which include the option Manual as the paper feed data d5 and the options 'A4 210×297 mm' and 'A4 lateral 210×297 mm' as the paper size data d1. In all the images expressed by the image data pic14 through pic21, paper inserted from a rear portion of the printer 14 passes through the printer 14 and is discharged from a front portion of the printer 14 as shown by the arrows representing the feed path. The paper is set either in the vertical direction or in the lateral direction according to the paper size data d1. The character 'A' printed on the paper is oriented either in the vertical direction (Portrait) or in the lateral direction (Landscape) according to the printing orientation data d3. The rectangle shown by the broken line on the paper is positioned either on the center or out of the center according to the printable area data d4.

FIG. 28 shows images expressed by the 4 combinations of image data pic22 through pic25, which include the option Manual as the paper feed data d5 and the option 'Envelop 120×235 mm' as the paper size data d1. In all the images expressed by the image data pic22 through pic25, paper inserted from a rear portion of the printer 14 passes through the printer 14 and is discharged from a front portion of the printer 14 as shown by the arrows representing the feed path. The character 'A' printed on the paper is oriented either in the vertical direction (Portrait) or in the lateral direction (Landscape) according to the printing orientation data d3. The rectangle shown by the broken line on the paper is positioned either on the center or out of the center according to the printable area data d4.

FIG. 29 shows an image expressed by the image data pic26 that includes the option Manual as the paper feed data d5 and the option 'Post Card 100×147 mm' as the paper size data d1. In the image expressed by the image data pic26, paper inserted from a rear portion of the printer 14 passes through the printer 14 and is discharged from a front portion of the printer 14 as shown by the arrow representing the feed path. The printing orientation on the post card is Portrait.

FIG. 30 shows images expressed by the image data pic27 and pic28, which include the option Tractor Feeder as the paper feed data d5 and the option Continuous Paper as the paper size data d1. In the images expressed by the image data pic27 and pic28, continuous paper inserted from a rear portion of the printer 14 passes through the printer 14 and is discharged from a front portion of the printer 14 as shown by the arrows representing the feed path. The character 'A' printed on the paper is oriented either in the vertical direction (Portrait) or in the lateral direction (Landscape) according to the printing orientation data d3.

These 28 combinations of image data pic01 through pic28 are stored in advance in the ROM 32. The CPU 30 selects a predetermined combination of image data among the 28 combinations of image data using the name of the image data specified in the map as the key of retrieval. The selected image data are stored in a certain work area on the RAM 33.

Referring back to the flowchart of FIG. 22, after the selection of image data at step S1150, the CPU 30 controls the CRTC 38 to display the image data stored in the certain work area in the data display section F6 on the Paper tab CD4 on the CRT display 12 at step S1160. The program then goes to RETURN and exits from this routine.

The display change routine discussed above enables a perspective view representing a three-dimensional image of the printer 14 to be displayed in the data display section F6 on the Paper tab CD4 that is open on the Properties dialog box DB1. The feed path of paper for printing is shown by the arrow in the perspective view. The perspective view on the CRT display 12 accurately informs the operator of the printing face and the feed path of paper in the printer 14.

This structure enables the operator to set paper in the printer 14 with the printing surface, the top and bottom, and the left and right of paper correctly oriented, thereby preventing wrong printing and making the printer 14 easy to use.

Figure 34:
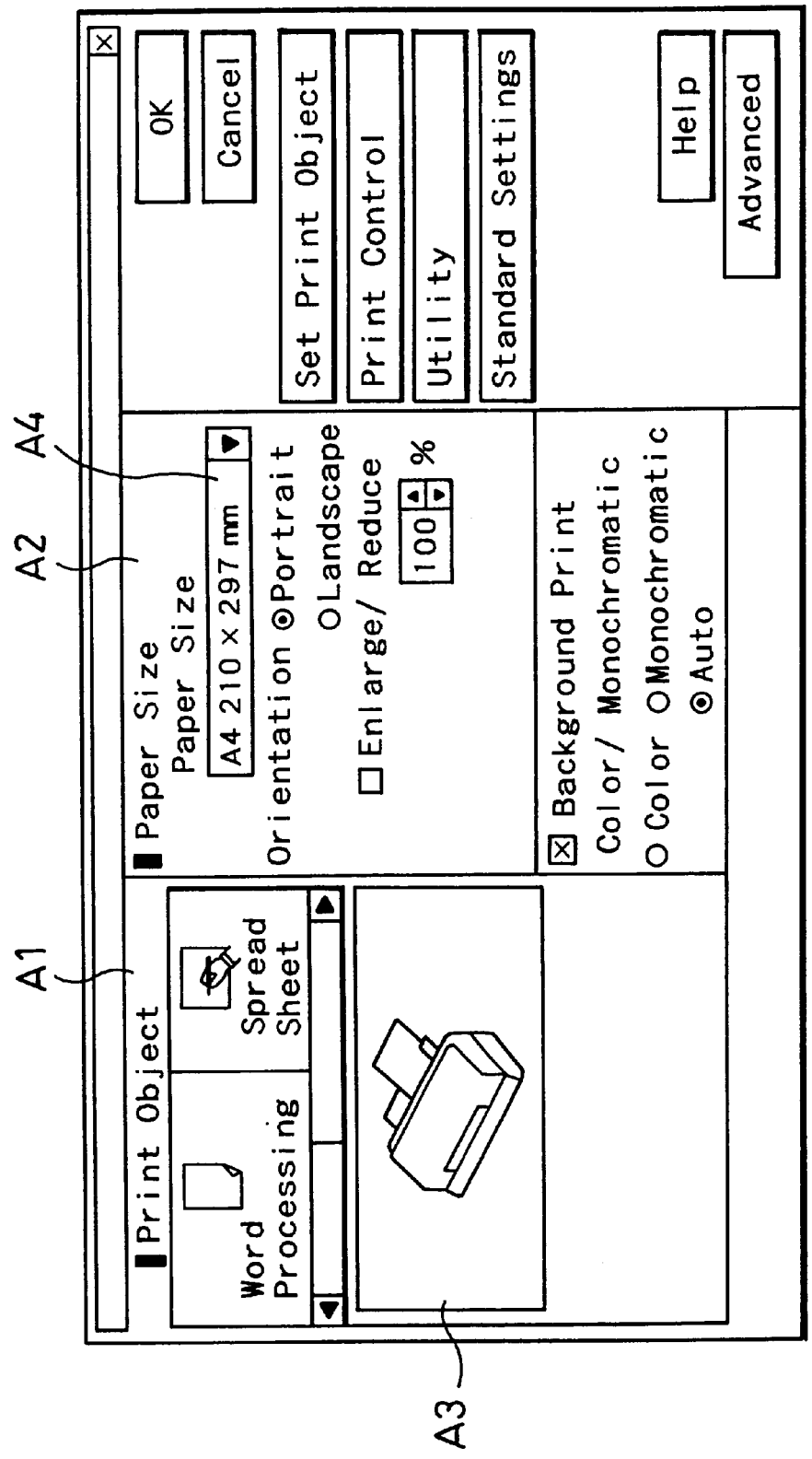
FIG. 34 shows a dialog box for paper settings in one state in the conventional printer driver.
Figure 35:
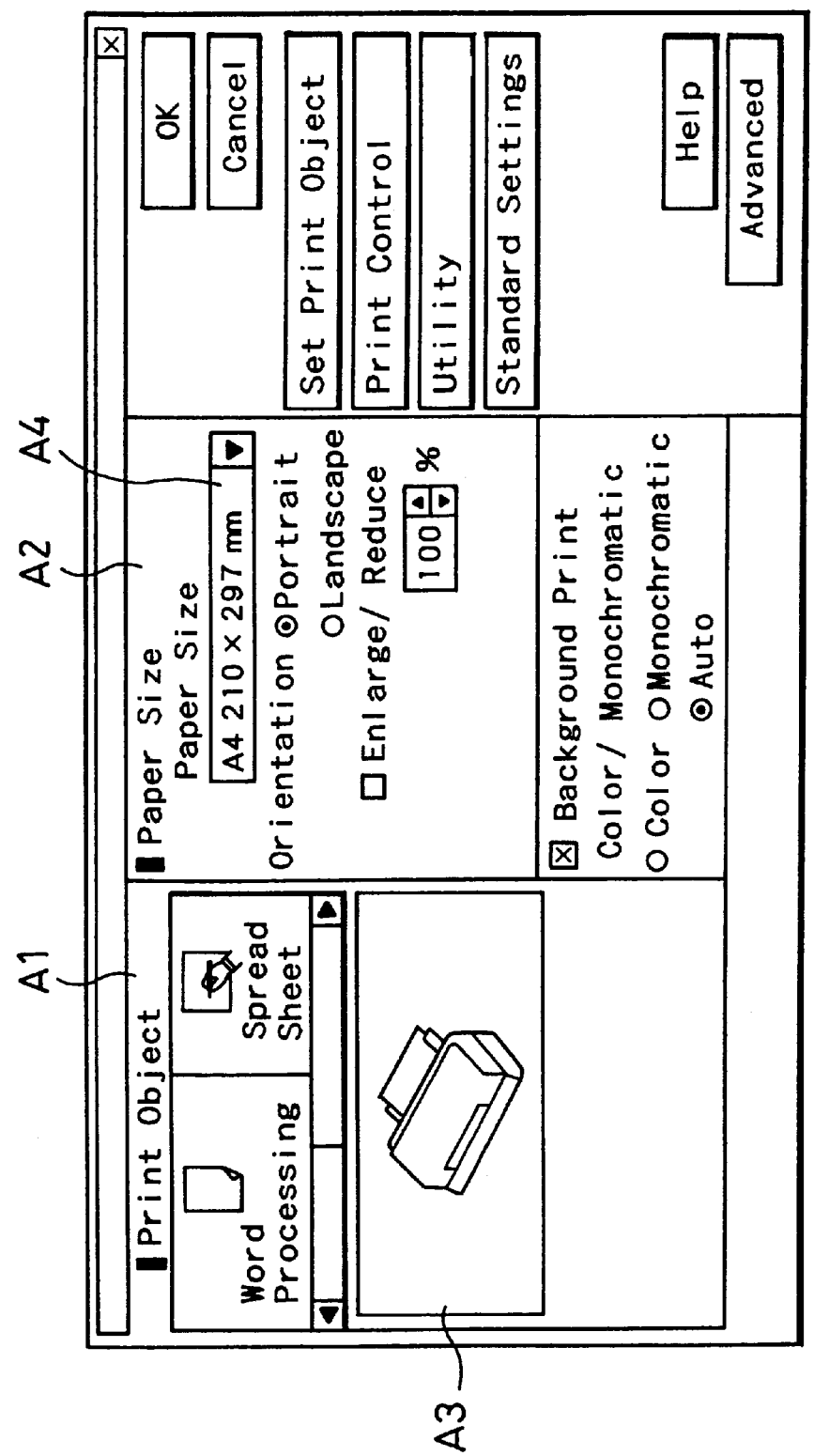
FIG. 35 shows the dialog box in another state.

The structure of this embodiment solves the problems arising in the prior art technique. FIGS. 34 and 35 show a paper-set dialog box in a conventional printer driver. Referring to FIG. 34, the dialog box includes an area A1 for specifying the printing object, such as word processing or spread sheet, an area A2 for specifying the size of paper, and an area A3 for showing a three-dimensional image of a printer. The three-dimensional image of the printer visually informs the operator of the orientation of paper and the position of a lever. By way of example, when 'A4 210×297 mm' is selected among a Paper Size drop-down list box A4, paper is set in the vertical direction in the three-dimensional image of the printer displayed in the area A3 as shown in FIG. 34. As another example, when 'A4 lateral 297×210 mm' is selected among the Paper Size drop-down list box A4, paper is set in the lateral direction in the three-dimensional image of the printer displayed in the area A3 as shown in FIG. 35. The display using the dialog box makes the printer driver easy to use.

Although clearly showing the orientation of paper, the prior art technique does not visually inform the operator of the printing face of paper. Surface and rear face are irreversible in some media, such as post cards, envelopes, letterheads, and any special sheets having specifically processed surface. When such paper is set in the printer, the adequate orientation of the surface of paper is essential for proper printing. The orientation of the top and bottom or the left and right of paper is also important in some media, such as post cards and binder sheets. The prior art technique does not inform the operator of such information. The structure of the embodiment, on the other hand, clearly informs the operator of appropriate orientation of not only the surface but the top and bottom or the left and right of paper. This makes the printer easy to use.

The structure of the embodiment also informs the operator of the feed path of paper set in a certain direction to the printer 14.

The perspective view displayed in the data display section F6 represents the three-dimensional image of the printer 14, so that the operator can view the feed path three-dimensionally. This structure clearly informs the operator of the appropriate orientation of the surface of paper. The computer system with this structure is accordingly easy to use.

In the embodiment discussed above, the perspective view showing the feed path of paper is displayed in the middle of the 'Properties' operation for set various pieces of information required for printing. The display is, however, not restricted to the middle of the 'Properties' operation, but may be any time in the middle of any operation by the printer driver. For example, the perspective view may be displayed in the data display section F6 immediately before the operator starts printing with the printer driver. This structure enables the required pieces of information, such as the feed path of paper, to be given to the operator at each time of printing.

Figure 31:
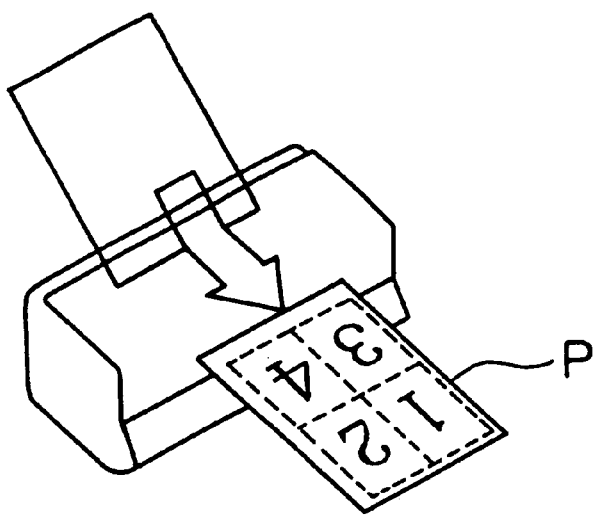
FIG. 31 shows an image representing a layout of pages.

In the above embodiment, the perspective view displayed in the data display section E6 may represent a layout of pages on the paper. FIG. 31 shows an image representing a layout of pages. Four pages, that is, two rows and two columns, are drawn on paper P in the perspective view. When it is required that a plurality of pages are laid out on one sheet of paper, this structure visually informs the operator of such a layout. The page numbers are also shown in the image to inform the operator of the order of pages.

Figure 32:
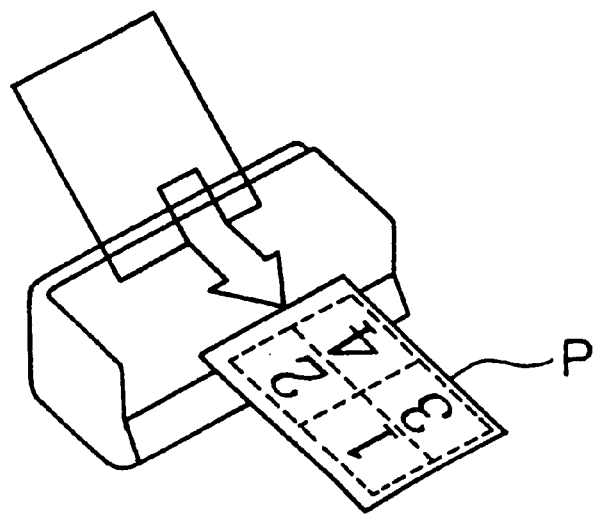
FIG. 32 shows an image representing another layout of pages.
Figure 33:
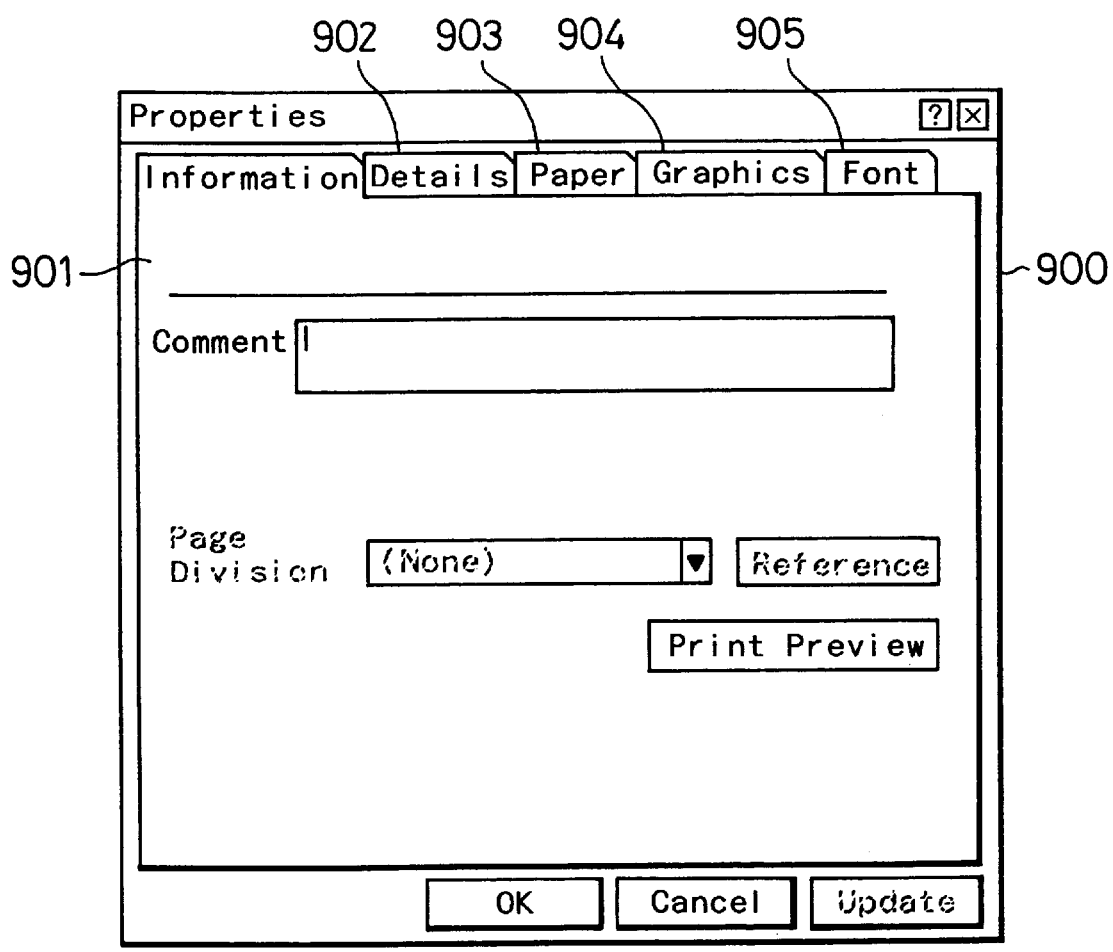
FIG. 33 shows a Properties dialog box 900 displayed by a conventional printer driver.

In the example of FIG. 31, the printing orientation is Portrait. FIG. 32 shows a similar layout of pages in Landscape.

In the example of FIG. 32, the numerals 1 through 4 drawn on the paper P are oriented in the lateral direction. The above embodiment relates to the computer system, in which the printer 14 is directly connected to the local computer 10 via cable. The principle of the present invention is also applicable to a computer system, in which a printer connected to a server on the LAN may be connected with a plurality of computers. As another example, the principle of the present invention may be applicable to a computer system that causes a printer connected to a server via the Internet to be controlled by a computer via the Internet.

The present invention is not restricted to the above embodiment or its modified examples, but there may be many other modifications, changes, and alterations without departing from the scope or spirit of the main characteristics of the present invention.

It should be clearly understood that the above embodiment is only illustrative and not restrictive in any sense. The scope and spirit of the present invention are limited only by the terms of the appended claims.

What is claimed is:

1. A printer control apparatus for setting various pieces of information required for printing in a predetermined printer, said printer control apparatus comprising:

tab image selection means for dividing said various pieces of information required for printing into a plurality of groups, providing image data that represent a plurality of tabs for various settings, each said tab corresponding to each of said plurality of groups, and selecting specific image data of a desired tab among said image data representing said plurality of tabs in response to an external instruction; and display control means for displaying said specific image data of said desired tab as display image data comprising a data input field and a data display field on a screen of a display unit, wherein the data input field receives data for setting information required for printing specified in the desired tab from an input unit and the data display field displays a list of plural pieces of information required for printing selected among plural pieces of information required for printing specified in another tab as another set of image data that are different from said specific image data of said desired tab in a predetermined area of said display image data.

2. A printer control apparatus in accordance with claim 1, wherein said desired tab corresponding to said specific image data selected by said tab image selection means specifies information on main settings relating to print quality, said another tab corresponding to said another set of image data specifying information on paper settings relating to paper.

3. A printer control apparatus in accordance with claim 1, wherein said desired tab corresponding to said specific image data selected by said tab image selection means has a switch for opening a customized settings dialog box, in which an operator can input plural pieces of information among said various pieces of information, said another set of image data representing said another tab constituting said customized settings dialog box.

4. A printer control apparatus for setting various pieces of print quality information that define printing quality by a predetermined printer as quality control information for controlling said predetermined printer, said printer control apparatus comprising:

first storage means for storing a plurality of parameters that represent the printing quality in a stepwise manner;

second storage means for storing values of said print quality information that are set corresponding to each of said parameters and determine the printing quality defined by said each parameter;

print quality specifying means for specifying the printing quality desired by an operator by selecting one parameter among said plurality of parameters, in response to an operation of said predetermined printer by said operator;

print quality information setting means for extracting the values of said print quality information corresponding to the parameter selected by said print quality specifying means from said second storage means, and setting the extracted values of said print quality information as said quality control information;

range limiting means for restricting parameters selectable by said print quality specifying means to a plurality of predetermined parameters among said plurality of parameters stored in said first storage means;

media material type setting means for setting a type of media used in said predetermined printer; and limited range changing means for changing said selectable parameters restricted by said range limiting means according to the type of media material set by said media type setting means.

5. A printer control apparatus in accordance with claim 4, wherein said print quality specifying means comprises:

display control means for displaying image data representing a specific image, which enables said operator to specify a desired printing quality through an input operation, as quality specification image data on a screen of a display unit; and data input means for inputting data in said specific image in response to said input operation by said operator, said range limiting means comprising:

display image data setting means for setting said quality specification image data as image data that represent an image including only said plurality of predetermined parameters as options of said print quality specifying means.

6. A printer control apparatus in accordance with claim 4, wherein said media type setting means comprises:
media type display control means for displaying image data representing an image, which enables said operator to specify the type of media through an input operation, together with said quality specification image data on the screen of said display unit.

7. A printer control apparatus for setting various pieces of information required for printing in a predetermined printer, said printer control apparatus comprising:
operation executing means for carrying out an operation to set said various pieces of information while making and displaying an image relating to said operation on a screen of a display unit; and
media information display control means for displaying an image having a representation of paper associated with a three-dimensional perspective view of said predetermined printer and a feed path for the paper inside said predetermined printer together with said image displayed by said operation executing means.

8. A printer control apparatus for setting various pieces of information required for printing in a predetermined printer, said printer control apparatus comprising:
operation executing means for carrying out an operation to set said various pieces of information while making and displaying an image relating to said operation on a screen of a display unit; and
media information display control means for displaying an image representing a feed path for paper inside a three-dimensional perspective view of said predetermined printer together with said image displayed by said operation executing means, wherein said media information display control means image further includes a representation showing orientation of paper set in said predetermined printer, in addition to said feed path.

9. A printer control apparatus for setting various pieces of information required for printing in a predetermined printer, said printer control apparatus comprising:
operation executing means for carrying out an operation to set said various pieces of information while making and displaying an image relating to said operation on a screen of a display unit, wherein said image relating to said operation includes a data input section that receives data for setting said various pieces of information from an input unit; and
media information display control means for displaying an image representing a feed path for paper inside a three-dimensional perspective view of said predetermined printer together with said image displayed by said operation executing means.

10. A printer control apparatus in accordance with claim 7, wherein the representation of the paper includes a representation of a printable area on the paper.

11. A printer control apparatus in accordance with claim 7, wherein the representation of the paper includes a representation of a layout of pages on the paper.

12. A method for setting various pieces of information required for printing in a predetermined printer, said method comprising the steps of:
(a) dividing said various pieces of information required for printing into a plurality of groups, providing image data that represent a plurality of tabs for various settings, each said tab corresponding to each of said plurality of groups, and selecting specific image data of a desired tab among said image data representing said plurality of tabs in response to an external instruction;
(b) displaying said specific image data of said desired tab as display image data comprising a data input field and a data display field on a screen of a display unit;
(c) receiving data for setting information required for printing specified in the desired tab from an input unit; and
(d) displaying in the data display field a list of plural pieces of information required for printing selected among plural pieces of information required for printing specified in another tab as another set of image data that are different from said specific image data of said desired tab in a predetermined area of said display image data.

13. A method of setting various pieces of print quality information that define printing quality by a predetermined printer as quality control information for controlling said predetermined printer, said method comprising the steps of:
(a) storing a plurality of parameters that represent the printing quality in a stepwise manner;
(b) storing values of said print quality information that are set corresponding to each of said parameters and determine the printing quality defined by said each parameter;
(c) specifying the printing quality desired by an operator by selecting one parameter among said plurality of parameters, in response to an operation of said predetermined printer by said operator;
(d) extracting the values of said print quality information corresponding to the parameter selected in said step (c) from the contents stored in said step (b), and setting the extracted values of said print quality information as said quality control information;
(e) restricting parameters selectable in said step (c) to a plurality of predetermined parameters among said plurality of parameters stored in said step (a);
(f) setting a type of media used in said predetermined printer; and
(g) changing said selectable parameters restricted in said step (e) according to the type of media set in said step (f).

14. A method of setting various pieces of information required for printing in a predetermined printer, said method comprising the steps of:
(a) carrying out an operation to set said various pieces of information while making and displaying an image relating to said operation on a screen of a display unit; and
(b) displaying an image having a representation of paper associated with a three-dimensional perspective view of said predetermined printer and a feed path for the paper inside said predetermined printer together with said image displayed in said step (a).

15. A computer program product for setting various pieces of information required for printing in a predetermined printer, said computer program product comprising:
a computer readable medium;
first program code means for causing a computer to divide said various pieces of information required for printing into a plurality of groups, provide image data that represent a plurality of tabs for various settings, each said tab corresponding to each of said plurality of groups, and select specific image data of a desired tab among said image data representing said plurality of tabs in response to an external instruction;

second program code means for causing the computer to display said specific image data of said desired tab as display image data comprising a data input field and a data display field on a screen of a display unit; and third program code means for causing the computer to receive data for setting information required for printing specified in the desired tab from an input unit and to display in the data display field a list of plural pieces of information required for printing selected among plural pieces of information required for printing specified in another tab expressed by another set of image data that are different from said specific image data of said desired tab in a predetermined area of said display image data, wherein each of said program code means is recorded on said computer readable medium.

16. A computer program product for setting various pieces of print quality information that define printing quality by a predetermined printer as quality control information for controlling said predetermined printer, said computer program product comprising:

a computer readable medium;

first program code means for causing a computer to store a plurality of parameters that represent the printing quality in a stepwise manner;

second program code means for causing the computer to store values of said print quality information that are set corresponding to each of said parameters and determine the printing quality defined by said each parameter;

third program code means for causing the computer to specify the printing quality desired by an operator by selecting one parameter among said plurality of parameters, in response to an operation of said predetermined printer by said operator;

fourth program code means for causing the computer to extract the values of said print quality information corresponding to the parameter selected by said third program code means from the contents stored by said second program code means and to set the extracted values of said print quality information as said quality control information;

fifth program code means for causing the computer to restrict parameters selectable by said third program code means to a plurality of predetermined parameters among said plurality of parameters stored by said first program code means;

sixth program code means for causing the computer to set a type of media used in said predetermined printer; and seventh program code means for causing the computer to change said selectable parameters restricted by said fifth program code means according to the type of media set by said sixth program code means, wherein each of said program code means is recorded on said computer readable medium.

17. A computer program product for setting various pieces of information required for printing in a predetermined printer, said computer program product comprising:

a computer readable medium;

first program code means for causing a computer to carry out an operation to set said various pieces of information while making and displaying an image relating to said operation on a screen of a display unit; and second program code means for causing the computer to display an image having a representation of paper associated with a three-dimensional perspective view of said predetermined printer and a feed path for the paper inside a three-dimensional perspective view of said predetermined printer together with said image displayed by said first program code means, wherein each of said program code means is recorded on said computer readable medium.

* * * * *

UNITED STATES PATENT AND TRADEMARK OFFICE
CERTIFICATE OF CORRECTION

PATENT NO.    : 6,295,136 B1
DATED         : September 25, 2001
INVENTOR(S)   : Ono et al.

It is certified that error appears in the above-identified patent and that said Letters Patent is hereby corrected as shown below:

<u>Title page, Item [54], and Column 1, lines 1-3,</u>
should read:

-- [54]  PRINTER CONTROL APPARATUS, METHOD OF CONTROLLING PRINTER, AND RECORDING MEDIUM USED THEREFOR --

Item [30], the Foreign Application Priority information should read:

-- [30]      Foreign Application Priority Data

Oct. 29, 1996   (JP)..........................................8-303949
Nov. 1, 1996    (JP)..........................................8-307338
Sep. 19, 1997   (JP)..........................................9-273598

Signed and Sealed this

Second Day of July, 2002

Attest:

Attesting Officer

JAMES E. ROGAN
*Director of the United States Patent and Trademark Office*